US012217611B1

(12) United States Patent
Ahmed et al.

(10) Patent No.: US 12,217,611 B1
(45) Date of Patent: Feb. 4, 2025

(54) COORDINATING A NUMBER OF UNMANNED AERIAL VEHICLES (UAVS) TO BE DEPLOYED IN A REGION UNDER A SET OF CONSTRAINTS

(71) Applicant: KING FAHD UNIVERSITY OF PETROLEUM AND MINERALS, Dhahran (SA)

(72) Inventors: Gamil Abdullah Mohsen Ahmed, Dhahran (SA); Tarek Rahil Omar Sheltami, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/749,912

(22) Filed: Jun. 21, 2024

(51) Int. Cl.
*G08G 5/00* (2006.01)
*G08G 5/04* (2006.01)

(52) U.S. Cl.
CPC ........... *G08G 5/0017* (2013.01); *G08G 5/045* (2013.01)

(58) Field of Classification Search
CPC ............................. G08G 5/0017; G08G 5/045
USPC .......................................................... 701/120
See application file for complete search history.

(56) References Cited

U.S. PATENT DOCUMENTS

2023/0337213 A1 10/2023 Badic et al.
2024/0210202 A1 * 6/2024 Sameer .................. G01C 21/20

FOREIGN PATENT DOCUMENTS

CN 117062089 A 11/2023
CN 117115203 A 11/2023
KR 20150136209 A * 12/2015
KR 102279956 B1 * 4/2020

OTHER PUBLICATIONS

A. Sonny, S. R. Yeduri and L. R. Cenkeramaddi, "Autonomous UAV Path Planning Using Modified PSO for UAV-Assisted Wireless Networks," in IEEE Access, vol. 11, pp. 70353-70367, 2023, doi: 10.1109/ACCESS.2023.3293203. (Year: 2023).*

W. Hao, C. Wu and S. Lin, "Research on UAV path planning based on improved particle swarm algorithm with inertia weight," 2023 IEEE International Conference on Control, Electronics and Computer Technology (ICCECT), Jilin, China, 2023, pp. 738-741, doi: 10.1109/ICCECT57938.2023.10141421. (Year: 2023).*

(Continued)

*Primary Examiner* — Isaac G Smith
(74) *Attorney, Agent, or Firm* — Oblon, McClelland, Maier & Neustadt, L.L.P.

(57) ABSTRACT

A method for coordinating deployment of unmanned aerial vehicles (UAVs) within a designated region involves obtaining constraint data that specifies the operational limitations under which the UAVs are allowed to operate. A cost function is defined, having a set of cost terms corresponding to these constraints, including a term for the energy consumption of each UAV. This energy consumption is the power required by each UAV to travel from a source to a destination along a prescribed flight path. The method includes executing a UAV-capacity maximization function that generates flight paths for the UAVs based on the cost function, which adjusts the flight paths to minimize the total energy consumed while ensuring that the UAVs do not breach the operational constraints.

15 Claims, 9 Drawing Sheets

(56) References Cited

OTHER PUBLICATIONS

M. Tariq, A. Saadat, R. Ahmad, Z. Abaid and J. J. P. C. Rodrigues, "Enhanced Border Surveillance Through a Hybrid Swarm Optimization Algorithm," in IEEE Sensors Journal, vol. 23, No. 22, pp. 28172-28181, Nov. 15, 15, 2023, doi: 10.1109/JSEN.2023.3317531. (Year: 2023).*
D. M. P. F. Silva, L. F. F. de Oliveira, M. G. M. Macedo and C. J. A. B. Filho, "On the Analysis of a Swarm Intelligence Based Coordination Model for Multiple Unmanned Aerial Vehicles," 2012 Brazilian Robotics Symposium and Latin American Robotics Symposium, Fortaleza, Brazil, 2012, pp. 208-213 (Year: 2012).*
S. Zhang and T. Cheng, "Optimizing Energy Consumption of Rotor UAV by Path Planning," 2022 Global Conference on Robotics, Artificial Intelligence and Information Technology (GCRAIT), Chicago, IL, USA, 2022, pp. 54-58, doi: 10.1109/GCRAIT55928.2022.00020. (Year: 2022).*
Souto et al. ; UAV Path Planning Optimization Strategy: Considerations of Urban Morphology, Microclimate, and Energy Efficiency Using Q-Learning Algorithm ; MDPI drones 7 ; Feb. 9, 2023 ; 34 Pages
Ahmed et al. ; A Safety System For Maximizing Operated UAVs Capacity Under Regulation Constraints ; Digital Object Identifier, vol. 4 ; 2021 ; 12 Pages.

* cited by examiner

COORDINATING A NUMBER OF UNMANNED AERIAL VEHICLES (UAVS) TO BE DEPLOYED IN A REGION UNDER A SET OF CONSTRAINTS

STATEMENT OF PRIOR DISCLOSURE BY AN INVENTOR

Aspects of the present disclosure are described in G. Ahmed and T. R. Sheltami, "A Safety System for Maximizing Operated UAVs Capacity Under Regulation Constraints," *IEEE Access*, vol. 11, pp. 139069-139081, 2023, incorporated herein by reference in its entirety.

STATEMENT OF ACKNOWLEDGEMENT

Support provided by the Interdisciplinary Center of Smart Mobility and Logistics at the King Fahd University of Petroleum and Minerals (KFUPM) Dhahran, Saudi Arabia under Project INML2300 is gratefully acknowledged.

BACKGROUND

Technical Field

The present disclosure is directed to a system and method for the coordinated management of UAV traffic in various environments, corresponding to safety, regulation compliance, and efficient path planning.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The advent of unmanned aerial vehicles (UAVs), commonly termed drones, have precipitated a transformative shift in numerous operational domains. The UAVs have been increasingly deployed for a range of applications, including but not limited to traffic oversight, environmental monitoring, and logistical delivery systems. The UAVs function efficaciously across diverse settings and scenarios, some of which are inaccessible or hazardous for human operatives. In urban contexts, the drones have been utilized increasingly for smart city initiatives, efforts that aim to integrate technology to streamline and enhance urban functionalities. The UAVs have shown utility in essential services, such as the rapid documentation of vehicular accidents, surveillance of natural catastrophes which aids in efficient emergency response, and the meticulous surveillance of construction sites, ensuring adherence to planning and safety regulations. The practicality of drones is further enhanced by their capacity to maneuver in close quarters and at varied altitudes, performing detailed inspections and precise operations that are beyond the scope of traditional methods.

However, with the increasing ubiquity of the UAVs, a set of challenges have emerged. The risks are associated with the UAVs, particularly in the context of national security, defense, and aviation safety. As the number of UAVs in the sky increases, so does the potential for accidents, creating a threat to both the security of civil aviation and the safety of ground traffic. High-profile incidents have underscored these dangers, with near-miss incidents between drones and manned aircraft becoming alarmingly common. A particular study highlights equipment malfunctions and the absence of coordination among aerial vehicles as predominant causes of such incidents.

The safety of individuals, property, and other users of airspace, such as helicopter traffic, has to be ensured when operating the UAVs. Special attention is required when the UAVs are operated near airfields, designated as no-fly zones (NFZs), due to the significant risks they pose during critical aircraft operations, such as take-off and landing. Consequently, UAV operations in these zones are subject to stringent regulations and surveillance to prevent any adverse events.

In urban environments, the buildings and infrastructural elements, each with its unique set of rules, further complicates UAV navigation. Drones, ranging in weight from a few hundred grams to tens of kilograms and capable of flying at altitudes from a few hundred to several thousand meters, can cause serious harm to people and infrastructure in case of malfunctions or accidents.

A crucial aspect of UAV operation safety relates to their flying altitude. UAVs operating at higher altitudes face increased risks of colliding with manned aircraft, especially within non-segregated airspace and controlled NFZs. Conversely, low-altitude flights are fraught with their own dangers, given the myriad of obstacles present in urban environments.

The environment in which UAVs operate is cluttered with structures and objects that pose navigational hazards. For example, a drone navigating through an urban landscape must contend with a multitude of obstacles, such as buildings of varying heights, power lines, and moving vehicles. This complex web of potential impediments requires advanced navigational algorithms capable of real-time processing and decision-making to avert collisions.

Given the increasing density of UAVs in shared airspaces, the risk of in-air collisions, referred to as intra-collisions, between UAVs is increased. This growing concern accentuates the need for a robust management system that ensures the orderly and safe operation of UAVs, particularly in densely populated or operationally critical regions.

The safe navigation and battery life are the inherent limitations of UAV operational functions. The UAVs, which predominantly rely on rechargeable power sources, face a constant battle between operational duration and performance capabilities. Here, one could consider the example of a drone tasked with a delivery service that must optimize its route to conserve energy, reducing the need for recharging stops and thus enhancing delivery speed and reliability.

CN117062089A discloses an unmanned aerial vehicle base station deployment. The unmanned aerial vehicle base station deployment optimization model is capable of providing service and the initial position of the unmanned aerial vehicle is obtained by solving the unmanned aerial vehicle base station deployment optimization model. However, various cost terms defined according to various constraints are not disclosed.

CN117115203A discloses a 3D multi-unmanned aerial vehicle cooperative track optimization method, device, and system for multi-target tracking. However, the maximization function where the number of UVAs is maximized and configured to fly iteratively is not disclosed.

US20230337213A1 discloses a central trajectory controller including a cell interface configured to establish signaling connections with one or more backhaul moving cells and to establish signaling connections with one or more outer moving cells. However, features contributing to optimization, such as the maximization function where the number of UVAs is maximized and configured to fly iteratively and various cost terms defined according to various constraints are not disclosed.

Each of the aforementioned disclosures suffers from one or more drawbacks hindering their adoption. The aforementioned disclosures fail to disclose optimization of the UAVs effective cost and operational functions. Therefore, there is need of a system that evaluates and integrates regulatory directives, environmental and terrain constraints, and the specific attributes of UAVs to formulate the most efficient and secure operational parameters. One more objective of the system is to ascertain the maximal operational capacity of a specific region, a determination of how many UAVs can be concurrently deployed without compromising safety standards.

SUMMARY

In an exemplary embodiment, a method of coordinating a number of unmanned aerial vehicles (UAVs) to be deployed in a region under a set of constraints is described. The method includes obtaining constraint data that is indicative of the set of constraints under which a group of UAVs are configured to fly in a region, and defining a cost function having a set of cost terms that correspond to the set of constraints. The set of cost terms includes an UAV energy consumption term that is indicative of an energy consumption of each UAV for flying from a source location to a destination location along a given flight path. The method further includes executing an UAV-capacity maximization function.

The maximization function is executed to generate flight paths of the group of UAVs, where the flight paths are determined using the cost function to minimize the energy consumed, and where the flight paths are adjusted to reduce the cost function to keep the group of UAVs from violating the set of constraints. The maximization function is further executed to determine a total number of UAVs configured to fly in the region without violating any cost term.

In some embodiments, the step of executing the UAV-maximization function to determine the total number of UAVs includes iteratively increasing a number of UAVs in the group of UAVs until a first cost term of the set of cost terms that is indicative of a distance between a pair of UAVs in the group of UAVs violates a collision constraint.

In some embodiments, each iteration includes increasing the number of UAVs in the group of UAVs by a specified quantity, obtaining the flight paths of the group of UAVs using the cost function, computing the first cost term based on the flight paths, and adding the specified quantity to the total number of UAVs based on a determination that the first cost term satisfies the collision constraint.

In some embodiments, the step of computing the first cost term includes determining a first distance between a first UAV of the pair of UAVs and a second UAV of the pair of UAVs based on location co-ordinates of the pair of UAVs obtained from the flight paths. The computing the first cost term further includes determining that the first cost term satisfies the collision constraint when the first distance is greater than a first threshold distance specified in the constraint data for collision constraint.

In some embodiments, the step of executing the UAV-capacity maximization function to generate the flight paths for the group of UAVs includes generating the flight paths using a particle swarm optimization technique.

In some embodiment, the step of executing the UAV-capacity maximization function to generate the flight paths for the group of UAVs includes obtaining a first set of flight paths for a first UAV of the group of UAVs, computing the cost function for each flight path of the first set of flight paths, and selecting one of the first set of flight paths for which the cost function evaluates to the least value as a first flight path of the flight paths of the first UAV.

In some embodiments, the step of selecting one of first set of flight paths includes adjusting the first flight path of the first UAV in an iterative manner until the cost function is minimized. Each iteration includes defining the first flight path of the first UAV based on positions of a first particle of a group of particles in a search space. A group of particles representative of the group of UAVs are configured to move in the search space representative of the region UAVs are configured to fly. The each iteration further includes computing the cost function for the first flight path based on the positions of the first particle, comparing the cost function of the first flight path with the cost function of a best flight path of the first UAV, and selecting the first flight path as the best flight path based on a determination that the cost function of the first flight path is lesser than the cost function of the best flight path.

In some embodiments, the step of defining the first flight path based on positions of the first particle in each iteration includes determining values of an inertia weight parameter, acceleration coefficients, and a speed parameter. The speed parameter is indicative of a speed at which the group of particles move in the search space, determining a velocity of the first particle corresponding to the first UAV in the search space based on (a) a velocity of the first particle, a first position of the first particle and a first position of the group of particles in a previous iteration, (b) the inertia weight parameter, and (c) the acceleration coefficients, and determining a position of the first particle in the search space based on a position of the first particle in the previous iteration, the velocity of the first particle and the speed parameter.

In some embodiments, the values of the inertia weight parameter and speed parameter are adjusted dynamically with each iteration.

In some embodiments, the values of the inertia weight parameter and speed parameter are determined based on a maximum number of iterations to be implemented for determining the flight paths.

In some embodiments, the step of adjusting the first flight path of the first UAV in an iterative manner includes, prior to execution of the iterations, computing an initial position and initial velocity of the first particle of the group of particles in the search-space using a one-dimensional logistic map, and assigning an initial flight path determined based on the initial position and initial velocity of the first particle as the best flight path for the first UAV.

In some embodiments, each of the flight paths includes multiple way points from a source location to a destination location. Each way point is represented using three-dimensional (3D) location coordinates.

In some embodiments, the step of defining the cost function includes obtaining obstacle data of an obstacle. The obstacle data includes 3D location coordinates of the obstacle and a radius of a half-sphere representative of the obstacle.

In some embodiments, the 3D location coordinates of the obstacle are determined based on 3D coordinates of a center of the half-sphere representative of the obstacle.

In some embodiments, the step of defining the cost function includes computing a second cost term of the set of cost terms that is indicative of a second distance between the obstacle and an UAV of the group of UAVs. The second distance is determined based on location coordinates of (a) the obstacle and (b) a particle of a group of particles corresponding to the UAV. The group of particles representative of the group of UAVs move in a search space is representative of the region. The step of defining the cost function further includes determining that the second cost term satisfies an obstacle constraint of the set of constraints when the second distance is greater than a second specified threshold specified in the constraint data for the obstacle constraint.

In some embodiments, the step of defining the cost function includes obtaining UAV data of an UAV of the group of UAVs. The UAV data includes 3D location coordinates, speed, and altitude of the UAV.

In some embodiments, the step of defining the cost function includes computing a third cost term of the set of cost terms that is indicative of the altitude of the UAV and determining that the third cost term satisfies an altitude constraint of the set of constraints when the altitude of the UAV is lesser than a third specified threshold specified in the constraint data for the altitude constraint.

In some embodiments, the step of defining the cost function includes computing a fourth cost term that is indicative of the speed of the UAV and determining that the fourth cost term satisfies a speed constraint of the set of constraints when the speed of the UAV is lesser than a fourth specified threshold specified in the constraint data for the speed constraint.

In some embodiments, the step of defining the cost function includes computing the UAV energy consumption term for an UAV of the group of UAVs based on a calculated (a) distance and speed to be traveled in each of a horizontal and vertical direction, and (b) angular speed and angle of turn taken by the UAV for the given flight path of the flight paths. The step of defining the cost function includes determining that the UAV energy consumption term satisfies an energy consumption constraint of the set of constraints when the energy consumption of the UAV is lesser than a fifth specified threshold specified in the constraint data for the energy consumption constraint.

In another exemplary embodiment, a non-transitory computer-readable storage medium for storing computer-readable instructions is described. The non-transitory computer-readable storage medium, when executed by a computer, cause the computer to perform a method. The method includes obtaining constraint data that is indicative of a set of constraints under which a group of UAVs are configured to fly in a region. The method further includes defining a cost function having a set of cost terms that correspond to the set of constraints. The set of cost terms includes an UAV energy consumption term that is indicative of an energy consumption of each UAV to fly from a source location to a destination location along a given flight path. The method further includes executing an UAV-capacity maximization function to generate flight paths of the group of UAVs and a total number of UAVs configured to fly in the region without violating any cost term. The flight paths are determined using the cost function to minimize the energy consumed. The cost function is reduced to keep the group of UAVs from violating the set of constraints.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
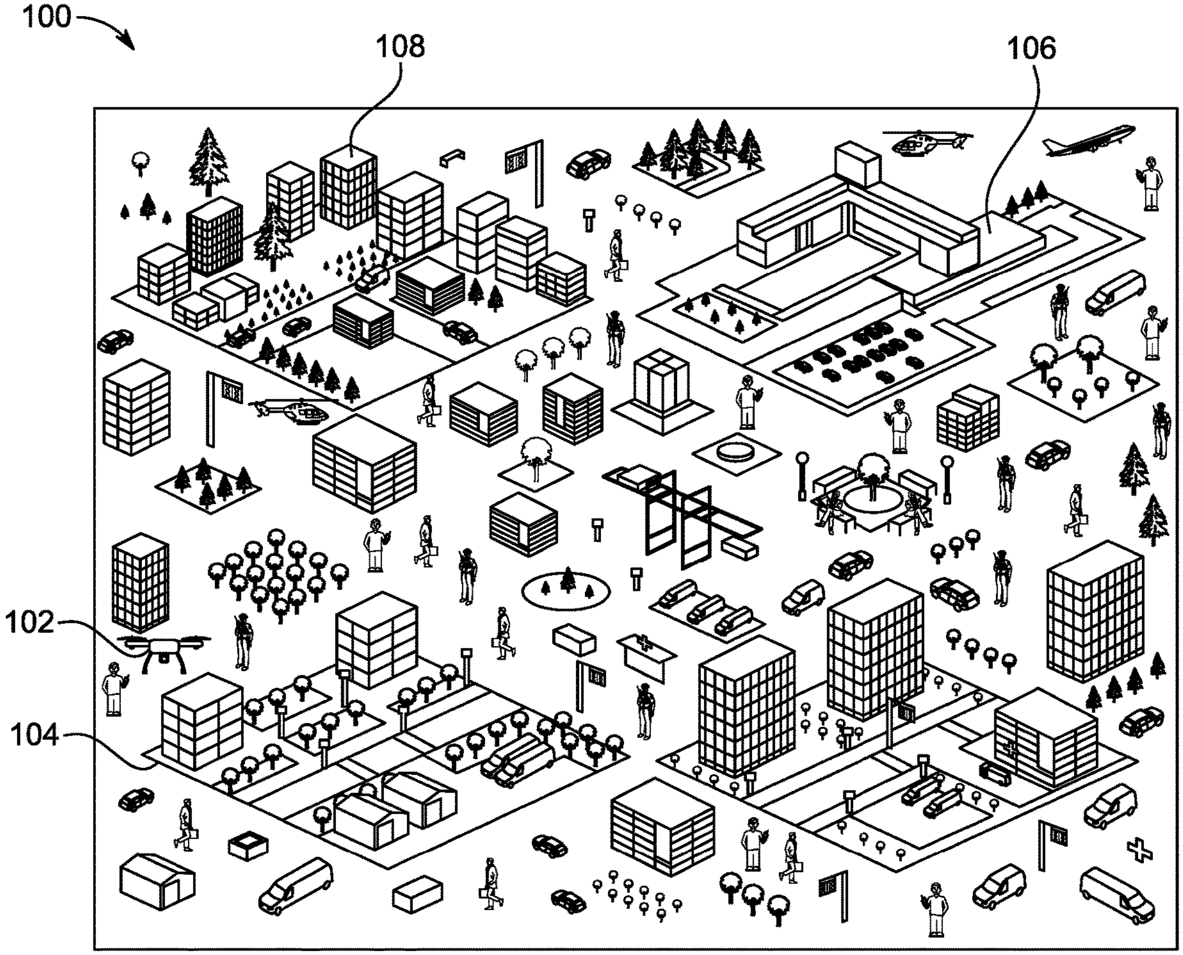
FIG. 1A illustrates an exemplary three-dimensional (3D) map of an urban environment having flying unmanned aerial vehicle(s) (UAVs), according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of the present disclosure are directed to a method configured for unmanned aerial vehicles (UAVs) to optimize their operational capacity within a specified region while adhering to regulatory and terrain constraints. The method implements an optimization technique to determine the maximum number of UAVs that can safely operate within the region without colliding. The method further involves incrementally increasing the number of UAVs and monitoring for collisions until the maximum safe capacity is reached.

The method includes specific regulation constraints, such as maximum altitude and speed, and regional constraints including obstacles, threats, and no-fly zones (NFZs). The method employs the Improved Particle Swarm Optimization (IPSO) method to generate collision-free and energy-efficient flight paths for the UAVs. The method's optimization framework is defined by two objective functions, a local objective function that minimizes energy consumption for individual UAV paths and a global objective function that maximizes the total number of UAVs that can safely operate within the region.

The method results in the development of a safety system that enhances UAV operational safety by considering various operational constraints, and the application of the IPSO technique to ensure optimal path planning and capacity utilization. The ability of method to adjust to different altitudes and obstacle sizes further enhances its utility and adaptability in diverse operational environments.

FIG. 1A illustrates an exemplary three-dimensional (3D) map of an urban environment 100 having flying unmanned aerial vehicle(s) (UAVs) 102, in accordance with certain embodiment of the present disclosure. The urban space is populated with various types of buildings and infrastructural elements designated, including residential units, commercial structures, and public amenities, such as parks and airport. The diversity in building types and their distribution across the urban landscape highlight the complex nature of urban environments where UAVs 102 may operate.

In addition to buildings, the urban environment is depicted with various transportation elements such as roads, which facilitate vehicular and pedestrian movement. The depiction of roads emphasizes the integration of UAVs 102 into environments where ground-based traffic must be considered to prevent disruptions and ensure safety.

A military airbase 104, represents a sensitive area where UAV flights are strictly regulated. Such regulations include restrictions on flying close to such facilities to prevent interference with military operations and ensure national security.

Airport area 106 is another critical area shown in the environment. The airport area 106 is also subject to stringent regulations concerning operations of UAV 102 to prevent interference with commercial and private aircraft operations during take-off and landing phases. Such regulations include avoiding flight in close proximity to these areas to mitigate risks of collisions and disruptions to manned aircraft.

The environment also illustrates various obstacles 108, such as trees, smaller buildings, residential complexes, commercial buildings, and other physical features that present navigational challenges for the UAVs 102. These obstacles 108 necessitate sophisticated navigation and control systems to ensure the UAVs 102 can operate safely and efficiently without collision.

The illustrated 3D urban environment serves as a foundational representation for understanding the operational constraints and regulatory requirements imposed on the UAVs 102 in urban settings. Such visualization aids in the conceptualization of systems that must manage traffic of UAV 102 in such environments, taking into consideration safety, efficiency, and compliance with local regulations. The depiction further supports the development of management system of UAV 102 that can dynamically adapt to varied urban landscapes and their associated challenges.

Each feature illustrated in the FIG. 1A aligns with operational and safety considerations necessary for the integration of the UAVs 102 into densely populated urban environments. Various studies have been conducted to render effective operations of UAV 102, focusing on safety, privacy, regulatory compliance, and overall management, particularly in view of use of drones in diverse environments.

Safety concerns are one of dominant challenges around the UAVs 102, particularly in contexts where they operate near sensitive zones, such as airfields and military bases. Launching drones in these areas during critical flight operations poses a significant risk of catastrophic incidents, impacting not just the safety of the airspace but also the ground operations of these facilities. For example, a drone may collide with an aircraft during take-off and landing process of the aircraft. Additionally, privacy issues also arise in sensitive areas, such as the military airbase 104, given the potential for drones to inadvertently or intentionally capture sensitive data. Diverse studies have highlighted these concerns, indicating comprehensive frameworks are necessary to address both the intentional and unintentional consequences of operation of UAV 102. For instance, studies have compared the safety and privacy regulations across different regions, revealing variations in the way UAVs 102 are governed to protect both individuals and national interests. These studies underscore the complexity of managing the UAVs 102 in a manner that respects privacy while ensuring safety.

In addition to the safety concerns, regulatory studies have also been considered while configuring the UAVs 102. The regulatory provide insights into how different nations have approached management of UAV 102, focusing on aspects, such as behavioral privacy, public safety, and national security. For example, research examining New Zealand's drone policies indicates a general satisfaction with current regulations, with only a minority advocating for changes. These insights are critical as they highlight user perspectives on the effectiveness of existing regulations and their impact on operation of UAV 102. Similarly, studies on the lawful use of drones, such as those conducted in the Slovak Republic, reveal gaps in current legislation that may not adequately address emerging challenges brought about by the increasing ubiquity of drones in commercial and public spaces.

Moreover, effective management of the UAVs 102, particularly in urban environments, presents another critical area of focus. The introduction of drone-following models indicates various approaches to managing traffic of UAV 102, aiming to prevent accidents and ensure efficient flow within the designated airspace. These models utilize parameters like drone acceleration and velocity adjustments to maintain safe distances between the UAVs 102, highlighting the potential for technological advancements to enhance traffic management in urban air transport systems.

Each of these areas reveals the dynamic and complex nature of operations of UAV 102, stressing the need for continuous evaluation and adaptation of regulatory frameworks to keep pace with technological advancements and societal needs. The increasing presence of the UAVs 102 in airspace may result in congestion, complicating the management and regulation of UAV 102 traffic. Furthermore, the risk of intra-collision among the UAVs 102 presents a significant safety challenge. As the number of UAVs 102 in an operational area rises, the likelihood of accidents also increases. It is therefore required to develop a robust system that enforces regulatory constraints and ensures the operational safety of the UAVs 102 within a specified region.

Additionally, a limitation of UAVs 102 is their restricted battery life, as these vehicles typically depend on rechargeable batteries for power. Enhancing the flight duration of the UAV 102 is essential. Enhanced flight duration can be achieved by equipping the UAVs 102 with an energy-efficient, collision-free path generator that is capable of producing flight paths that minimize energy consumption.

The various studies have focused on a global consensus on the importance of developing robust systems to manage the integration of the UAVs 102 into everyday life while ensuring public safety, privacy, and compliance with evolving regulatory landscapes. These studies collectively contribute to a deeper understanding of the challenges and opportunities presented by UAV technology, guiding the development of more effective management and regulatory approaches.

Figure 1B:
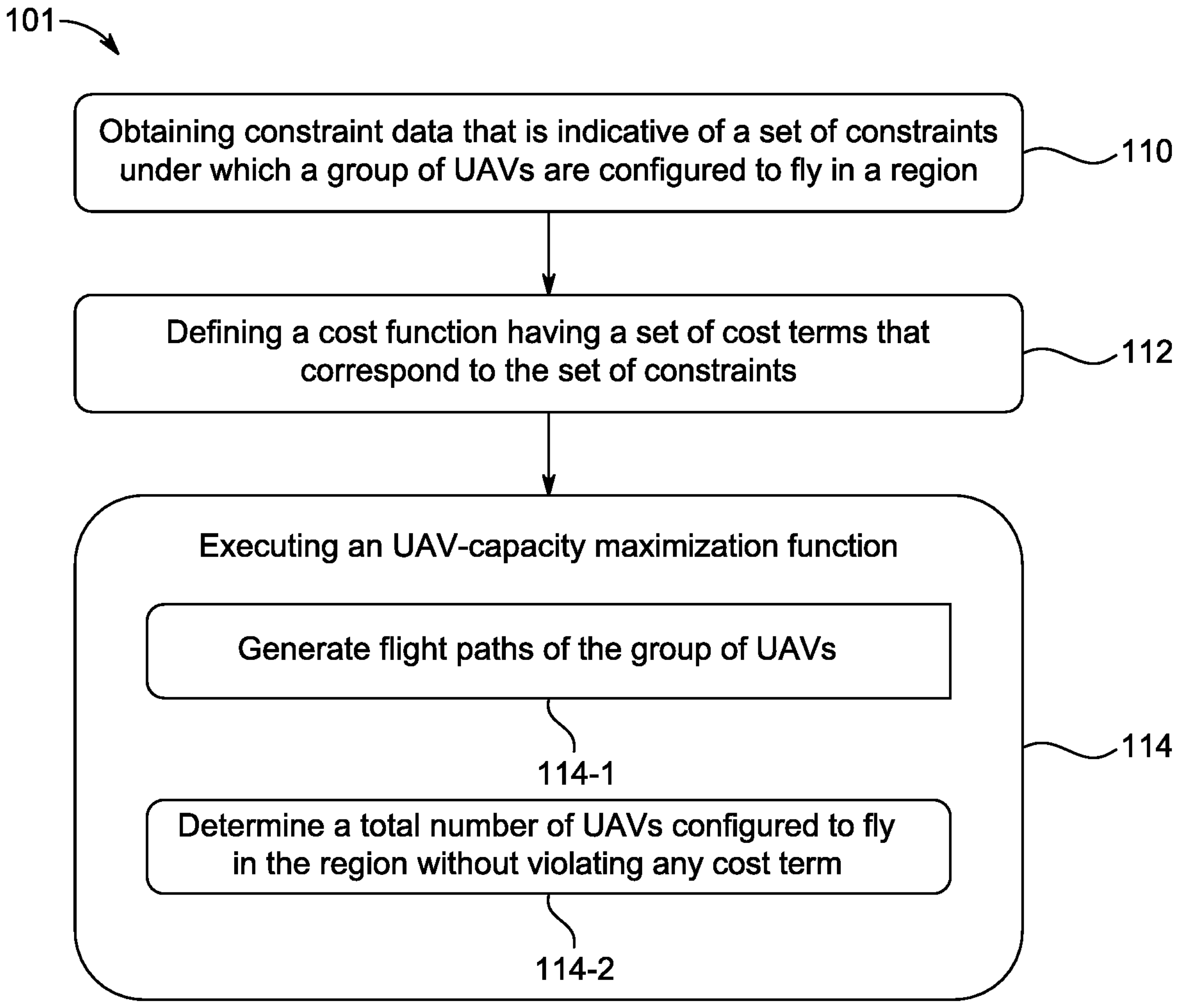
FIG. 1B illustrates a method for coordinating the UAVs within a defined region under specific constraints, according to certain embodiments.

FIG. 1B illustrates a method 101 for coordinating the UAVs 102 within a defined region under specific constraints. At step 110, constraint data which is indicative of a set of constraints under which a group of UAVs 102 are configured to fly in a region is obtained. The set of constraints may include at least one of (a) an obstacle constraint, which is a constraint for avoiding collision of the UAVs with obstacles in the environment, (b) a UAV collision constraint, which is a constraint for avoiding collision between UAVs, (c) an altitude constraint, which defines the minimum or maximum altitude of the UAVs flight, or (d) a speed constraint, which defines the minimum or maximum speed of the UAVs flight. The constraint data may also include, but is not limited to, geographical boundaries, no-fly zones, and proximity to sensitive areas, such as airports or military bases.

At step 112, a cost function is defined. The cost function includes a set of cost terms that correspond to the constraints identified in step 110. One of the cost terms within this function is the energy consumption term of UAV 102, which is indicative of the energy consumption of each UAV 102 as it travels from a source location to a destination location along a given flight path. The cost function is designed to quantify various operational metrics, such as fuel or energy usage, risk of violation of airspace regulations or other constraints, and efficiency of the flight path in terms of time or distance.

At step 114, a capacity maximization function of UAV 102 is executed. This function performs two primary operations. First, at sub-step 114-1, it generates flight paths for the group of UAVs 102. In an example, the flight paths are generated using the PSO technique. A set of flight paths is obtained for each UAV of a group of UAVs 102. Accordingly, a first set of flight paths is obtained for a first UAV of the group of UAVs 102. The set of flight paths are determined by computing the cost function for each flight path of the first set of flight paths, with the objective of minimizing the energy consumed during flight. One of the first set of flight paths for which the cost function evaluates to the least value is selected as a best flight path of the first UAV. In some embodiments, determining a best flight path is an iterative process, where each iteration may include (a) determining a flight path (e.g., according to IPSO technique) based on certain path determination parameters (e.g., PSO parameters such as position and velocity of a particle, inertia weight parameter, acceleration coefficients, a speed parameter, etc.) (b) computing a cost function associated with the corresponding flight path, (c) comparing the value of the cost function with the value of the cost function associated with a best flight path (e.g., which is initialized to the cost function value associated with a flight path of the first iteration), (d) if the value of cost function is lesser than the value of the cost function of the best path, storing the flight path of the current iteration as the best flight path, else adjusting the path determination parameters and computing the flight path for the next iteration based on the adjusted path determination parameters. The flight paths are adjusted dynamically to optimize the cost function value, thereby ensuring that the UAVs 102 do not violate the predefined constraints. Thereafter, one of the first set of flight paths for which the cost function evaluates to the least value is selected as a best flight path of the first UAV.

Second, at sub-step 114-2, the function determines the total number of UAVs 102. The function can be configured to iteratively increase a number of UAVs in the group of UAVs 102 until a first cost term of the set of cost terms that is indicative of a distance between a pair of UAVs in the group of UAVs 102 violates the collision constraint. In one aspect, each iteration includes increasing the number of UAVs in the group of UAVs 102 by a specified quantity, obtaining the flight paths of the group of UAVs 102 using the cost function, computing the first cost term based on the flight paths, and determining whether first cost term satisfies the collision constraint. In some embodiments, the collision constraint may be satisfied when the distance between two UAVs is greater than the minimum distance or the "safety distance" to be maintained between two UAVs. The process may be continued by increasing the quantity to the total number of UAVs 102 until the first cost term violates the collision constraint. The sub-step 114-2 includes a calculation to ensure that adding any additional UAVs 102 would not lead to exceeding energy allowances or violating other constraints set forth in the cost function.

The present method allows for the efficient and safe operation of UAVs 102 within a specified region by ensuring that all operational constraints are adhered to, while optimizing the energy consumption and overall operational capacity of the fleet of UAVs 102. The method 101 supports sustainable and compliant UAV operations, particularly in complex environments where multiple variables and restrictions must be managed simultaneously.

Figure 2:
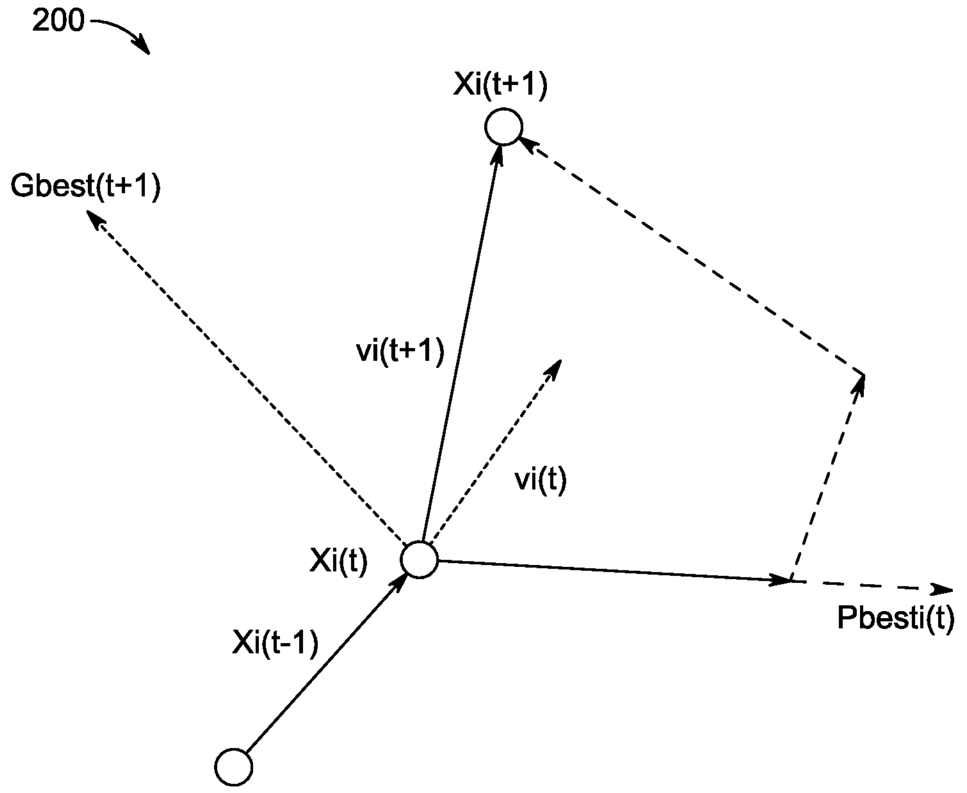
FIG. 2 illustrates a graphical representation of a standard Particle Swarm Optimization (PSO) algorithm, according to certain embodiments.

FIG. 2 illustrates a graphical representation of the standard Particle Swarm Optimization (PSO) algorithm, in accordance with certain embodiment. The graph 200 illustrates the movement dynamics of particles within the search space over time. In FIG. 2, movement of each particle is driven by both personal and collective historical data, aiming to find optimal solutions in a multi-dimensional search space.

The swarm algorithm is a computational algorithm inspired by the swarming behavior of salps in the ocean. Salps move in a swarm in a chain-like formation, a behavior that is translated into an algorithmic context to solve optimization problems. In context with the present disclosure, the standard PSO algorithm is a computational method used to optimize a problem by iteratively trying to improve a candidate solution with regard to a given measure of quality. It solves a problem by having a population of candidate solutions, here dubbed particles, and moving these particles around in the search space according to simple mathematical formulae over the position and velocity of particles.

In FIG. 2, the positions of a particle at three sequential time steps are marked as Xi(t−1), Xi(t), and Xi(t+1), corresponding to its location in the search space at times t−1, t, and t+1, respectively. These points represent the trajectory of the particle as the trajectory explores the search space to minimize or maximize the function it is tasked with optimizing.

The vector vi(t) denotes the velocity of the particle at time t, determining the direction and magnitude of movement of the particle from Xi(t) to Xi(t+1). The updated velocity vi(t+1) is calculated based on a combination of the previous velocity of the particle and the influences of its personal best position and the global best position found by the swarm.

The personal best position Pbest(1) represents the solution that the particle has found individually up to time t. The position serves as a local attractor for the particle, influencing its subsequent movements by pulling it towards this locally optimal point.

The global best position Gbest(t+1) represents the best solution found by particles in the swarm up to time t+1. This point acts as a global attractor, guiding the entire swarm toward this most promising area of the search space.

The graphical representation emphasizes the iterative process where each particle adjusts its trajectory based on both its own experience and the successes of its peers within the swarm. The adjustment is depicted by the dotted lines indicating the paths from the current position to the personal and global best positions, influencing the next position of the particle. The collective behavior modeled by the PSO algorithm is intended to balance exploration of the search space, avoiding local optima and premature convergence issues highlighted in the present disclosure.

To address the limitations encountered by the PSO algorithm, particularly issues of local optima entrapment and premature convergence, an enhanced variant, Improved Particle Swarm Optimization (IPSO), is proposed. The IPSO algorithm is implemented augmenting the diversity of the solution space and refining the update strategies for the swarm particles. The IPSO is a variant of the standard PSO algorithm designed to enhance its performance by addressing some of the common pitfalls associated with the basic PSO, such as premature convergence to local optima and insufficient exploration of the search space. The IPSO introduces modifications to the standard mechanism of updating particle velocities and positions with the intent to strike a better balance between exploration, for example, searching new areas in the search space, and exploitation, for example, fine-tuning current solutions.

The IPSO begins with a chaos-based initialization of the swarm particles utilizing the logistic map equation:

$$X_{n+1}=\mu X_n(1-X_n) \quad (1)$$

where $X_n$ is the $n^{th}$ chaotic variable and μ represents the bifurcation coefficient. Such initialization method serves to increase the variability and reach of the solution space, which is crucial for avoiding local optima.

In one aspect, the IPSO algorithm operates with two primary phases. The initial phase focuses on exploration or searching to maximize diversity, while the latter phase concentrates on convergence towards the optimal solution. The transition between these phases is managed through an adaptive mutation technique, which dynamically updates the position and velocity of the particles based on both local and global best-known positions.

Velocity update of each particle is governed by the equation:

$$v_{t+1}=\omega v_t+c_1r_1(p\mathrm{Best}_t-x_t)+c_2r_2(g\mathrm{Best}_t-x_t) \quad (2)$$

Where, ω represents the inertia weight, crucial for balancing exploration and exploitation by modulating the influence previous velocity of the particle. c1 and c2 are acceleration coefficients that weigh cognizance of the particle of personal and swarm-wide best positions respectively, modulated by random vectors r1 and r2.

In optimization challenges, it is essential to achieve an equilibrium between exploration and exploitation, a critical function facilitated by the adjustment of inertia weight. Exploration is the process of searching for novel solutions, whereas exploitation concentrates on enhancing already discovered solutions. Appropriately balancing these aspects is critical because excessive exploration may delay convergence to the global optimum, whereas too much exploitation might cause the process to become entrapped in local optima.

Adjusting the inertia weight within the algorithm plays a pivotal role in managing the balance between exploration and exploitation. Initially setting a higher inertia weight encourages exploration, helping to prevent premature convergence. Over time, reducing the inertia weight gradually shifts the emphasis towards exploitation, allowing for the refinement of solutions. Such strategic adjustment of the inertia weight ensures that the exploration of the search space is thorough yet focused, thereby consistently moving towards the optimal solution and enhancing the overall efficiency and effectiveness of the optimization process.

Inertia weight (ω) is adaptively adjusted per iteration to fine-tune the trade-off between extensive exploration of the search space and intensive exploitation of known good solutions. In simple terms, a high value of ω promotes exploration of the search space, while a low value facilitates exploitation. To describe this aspect further, w is adjusted linearly based on a certain formula as follow:

$$\omega(t)=\omega_{min}+\frac{MaxIt-t}{MaxIt}*(\omega_{max}-\omega_{min}) \quad (3)$$

Where MaxIt is maximum simulation time and t is current simulation time, $\omega_{min}$, $\omega_{max}$ are minimum and maximum value of inertia, respectively.

The velocity update also involves the acceleration constants c1 and c2, which guide the particles towards their personal best and the global best positions found by the swarm. The settings for these constants are crucial for ensuring an effective balance between local searches by individual particles and their alignment towards overall best findings of the swarm.

The positional update of each particle is defined by, when these values are multiplied by random vectors r1 and r2, they can have a controlled stochastic effect on the velocity. Furthermore, the values represent the weight of information sharing among particles. For instance, if both c1 and c2 are set to zero, a particle relies solely on its own knowledge. However, if c1 is greater than c2, particles tend to move towards the local attractor, while if c2 is greater than c1, particles tend towards the global attractor. Therefore, c1 and c2 are selected based on running experiments within the range of $c_{min}$ to $c_{max}$. The objective is to choose values that achieve both exploration and exploitation. Finally, the position of particles is calculated using the following formula.

$$x(t+1)=x(t)+\epsilon v(t+1) \quad (4)$$

The value of ϵ determines the speed at which the particle moves. A high value of ϵ enables the system to quickly move towards the best-known regions but may make it difficult to perform fine-grained optimization. Conversely, a low value of ϵ fine-tunes the solution and accelerates convergence. To achieve a balance during the optimization process, the particle initially explores the search space and make large jumps towards better regions. In later iterations, the speed of particles is reduced to achieve faster convergence. Therefore, e needs to be adapted dynamically with each iteration and can be written as follow:

$$\epsilon = \epsilon_{max} - \frac{(\epsilon_{max} - \epsilon_{min})t}{MaxIt} \quad (5)$$

where $\epsilon_{max}$, $\epsilon_{min}$ are constant value and $\epsilon_{max} > \epsilon_{min}$, t is current simulation time and MaxIt is total simulation time.

Thus, the IPSO is designed to provide a robust mechanism for navigating complex optimization landscapes, ensuring that both broad explorative searches and targeted exploitative adjustments are effectively balanced, thereby optimizing the convergence towards the global optimum.

In the system described, the objective is to facilitate a safety path, including multiple way points, for maximum capacity of UAVs 102, enabling them to travel from source locations to their destinations while navigating around potential obstacles such as mountains, buildings, radars, and other hazards that may be present in the environment. In one aspect, each way point is represented using 3D location coordinates. The system specifically considers formations of multiple UAVs 102 operating concurrently, necessitating the integration of path planning strategies that address both the terrain and the arrangement of formations of UAVs 102 to avoid obstacles effectively.

The configuration of the UAVs 102 within the formation is denoted by pairs of position and velocity values, represented as:

$$(p_1,v_1),(p_2,v_2), \ldots (p_N,v_N) \quad (6)$$

To describe a three dimensional path planning problem, let N is the number of way points for each particle, then the $i^{th}$ position and velocity vector of particle can be respectively written as follow:

$$p_i=p_i(x_1,y_1,z_1),p_i(x_2,y_2,z_2), \ldots ,p_i(x_N,y_N,z_N) \quad (7)$$

$$v_i=v_i(x_1,y_1,z_1),v_i(x_2,y_2,z_2), \ldots ,vi_{(x_N,y_N,z_N)} \quad (8)$$

Optimization algorithms are utilized in path planning to determine a viable route for a drone to travel from a starting point to a destination point within a complex environment. The path should be suitable for use by the algorithm, and the flying space must be confined. In the context of 3D path planning, the boundary of the flying space can be described as:

$$(x,y,z)|x_{min} \leq x \leq x_{max}, y_{min} \leq y \leq y_{max}, z_{min} \leq z \leq z_{max} \quad (9)$$

Where $x_{min}$, $y_{min}$, $z_{min}$ are the lower bounds of the flying space and $x_{max}$, $y_{max}$, $z_{max}$ are the upper bounds of the flying space.

In the present disclosure, the space boundaries and locations of obstacles are assumed to be known in advance. The obstacle is modeled as a half sphere as follows:

$$O_k=(x_k,y_k,z_k,r_k) \quad (10)$$

Where $x_k$, $y_k$, $z_k$ are the three-dimensional coordinate of $K^{th}$ obstacle and $r_k$ is the corresponding radius of the obstacle.

$$x_k=r_k \cos(\theta)\sin(\phi)+x_{k0} \quad (11)$$

$$y_k=r_k \sin(\theta)\sin(\phi)+y_{k0} \quad (12)$$

$$z_k=r_K \cos(\phi)+z_{k0} \quad (13)$$

where $x_{k0}$, $y_{k0}$, $z_{k0}$ is the center coordinate of $k^{th}$ obstacle, $\theta \in [0\ 2\pi]$, and $\varphi \in [0\ \pi/2]$.

The system and method of the present disclosure are designed to maximize the number of UAVs 102 operating in a target region while adhering to various regulations. The method determining the maximum safe operating speeds and collision avoidance rules to ensure UAVs 102 do not collide during flight. Collision avoidance is critical and is managed by maintaining a minimum safe distance between the UAVs 102, which is defined by collision constraint, and between the UAVs 102 and obstacles, which is defined by obstacle constraint. Optimization of flight paths is performed through algorithms that take into account minimum safe distance of each UAV 102, among other factors.

Monitoring and adjustment of the flight paths of UAVs 102 are continuously performed during operation to ensure that all UAVs 102 operate within the defined safety and regulatory constraints. Determining the most optimized path, i.e., the best flight path, includes computation of an initial position and initial velocity of the first particle of the group of particles in the search-space using a one-dimensional logistic map, prior to execution of the iterations of the flight path determination. The determination of the flight path further includes assignment of an initial flight path determined based on the initial position and initial velocity of the first particle as the best flight path for the first UAV. Safety and regulatory constraint involve dynamically adjusting the initial flight path (e.g., iteratively) to prevent any breaches of the collision constraint or other operational limits.

Obstacle avoidance is managed by a constraint model where trajectory of each UAV 102 is evaluated against known obstacles within the flight area. If a UAV path intersects with any obstacle as defined by the radius and position of the obstacles, the UAV path is penalized heavily to ensure it is discarded from consideration. Similarly, UAV member collision avoidance is managed by ensuring all the UAVs 102 in the formation maintain a prescribed safety distance from one another. If the calculated distance between any two UAVs 102 falls below this safety threshold, the paths are adjusted or discarded.

Moreover, altitude and speed constraints are rigorously enforced. The UAVs 102 are required to operate below a specified maximum altitude and speed, with any violation resulting in the reconfiguration or discarding of the flight path. Such constraint enforcement ensures that the UAVs 102 operate safely and efficiently within their operational environment.

One objective of the present embodiment is to establish a safe navigational path enabling the maximum capacity of the UAVs 102 to traverse from origin points to designated destinations. This requires careful consideration of various environmental hazards, such as mountains, buildings, radars, and other potential obstacles.

The constraints for obstacle avoidance are defined such that the system calculates an obstacle constraint.

Let N_Obs is the number of obstacles and NFZs, and $N_d$ is a number of UAVs 102. The obstacle constraint, Obc (i, j), i=1, 2, . . . , $N_d$ and j=1, 2, . . . , N_Obs, can be obtained as follow:

$$= \sqrt{(Ux_i - Ox_j)^2 + (Uy_i - Oy_j)^2 + (Uz_i - Oz_j)^2} \quad (14)$$

If a point of UAV 102 path goes through obstacles, the path is penalized by a high value to discard it. Thus, the cost of collision with obstacle can be formulated as follows:

$$J_1 = \begin{cases} \infty, & \text{if } Obc(i, j) < \text{R\_obs}_j \\ 0, & \text{Otherwise} \end{cases} \tag{15}$$

where $\text{R\_obs}_j$ is the minimum distance to be maintained between an UAV and the obstacle.

In some embodiments, the obstacle constraint may be satisfied when the distance between an UAV and an obstacle is greater than a minimum distance to be maintained between a UAV and an obstacle.

The collision constraint, or the UAV member constraint, is defined to avoid collisions among the UAVs 102 in the flying space. Therefore, a distance between a first UAV of the pair of UAVs 102 and a second UAV of the pair of UAVs 102 is determined based on location co-ordinates of the pair of UAVs 102 obtained from the flight paths. The distance between UAVs 102 is determined as follow:

$$Uc(i, j) = \sqrt{(Ux_i - Ux_j)^2 + (Uy_i - Uy_j)^2 + (Uz_i - Uz_j)^2} \tag{16}$$

The UAV member constraint keeps tracking the distance between a pair of UAVs 102 (e.g., using Eq. (15)). If the distance between the first UAV of the pair of UAVs 102 and the second UAV of the pair of UAVs 102 is smaller than a safety distance (SD), which is a threshold distance or minimum distance to be maintained between any two UAVs), the paths are discarded. The cost of collision with other members can be formulated as follows:

$$J_2 = \begin{cases} \infty & \text{if } Uc(i, j) < SD \\ 0, & \text{Otherwise} \end{cases} \tag{17}$$

In some embodiments, the collision constraint may be satisfied when the distance between two UAVs is greater than the minimum distance or the "safety distance" to be maintained between two UAVs. An altitude constraint is defined to ensure that the UAVs altitude is within a range of altitude, greater than a minimum altitude or less than a maximum altitude. In an example, the altitude constraint of UAVs 102 should not exceed 120 m. So, the cost of altitude can be formulated as follows:

$$J_3 = \begin{cases} \infty, & \text{if UAV\_altitude} > \text{Maximum altitude} \\ 0, & \text{Otherwise} \end{cases} \tag{18}$$

In some embodiments, the altitude constraint may be satisfied when the altitude of the UAV is lesser than a maximum permissible or predefined threshold altitude of the UAV. The flight path may be adjusted or discarded if the cost term indicative of the altitude constraint violates the altitude constraint (e.g., greater than the safe distance).

A speed constraint is defined to ensure that the UAVs speed during flight is within a range, greater than a minimum speed, or less than a maximum speed. For example, the speed constraint can indicate that the maximum speed of the UVA 102 should not exceed 44 mps. So, the cost associated with speed constraint can be formulated as follows:

$$J_4 = \begin{cases} \infty, & \text{if UAV\_speed} > \text{Maximum Speed} \\ 0, & \text{Otherwise} \end{cases} \tag{19}$$

In some embodiments, the speed constraint may be satisfied when the speed of the UAV is lesser than a maximum permissible or predefined speed of the UAV. The flight path may be adjusted or discarded if the cost term indicative of the altitude constraint violates the altitude constraint (e.g., greater than the safe distance).

The objective function is a concept that determines how various variables contribute to a specific value, and the optimization algorithm either maximizes or minimizes this value. In one aspect of the present embodiment, the local objective function is designed and applied in the IPSO to obtain the paths of the UAVs 102.

One of the objectives in the UAV path planning is the energy consumption, and the path with minimum energy required is desirable. Computation of the UAV energy consumption term for an UAV of the group of UAVs 102 is based on a calculated (a) distance and speed to be traveled in each of a horizontal and vertical direction, and (b) angular speed and angle of turn taken by the UAV for the given flight path of the flight paths. For example, the total energy consumed in a flight path may be represented as follows:

$$T_E = f(E_h, E_v, E_{turn}) \tag{20}$$

where $E_h$, $E_v$, $E_{turn}$ are energy consumed in horizontal flying, vertical flying, and in taking turns, respectively. The horizontal energy may be computed as:

$$E_h = P_h * \frac{v}{d}) \tag{21}$$

Where $P_h$ is power consumption due to flying d horizontal distance with v horizontal speed.

The vertical energy may be computed as:

$$E_{v(\Delta h)} = P_v * \frac{\Delta h}{V_v}) \tag{22}$$

Where $P_v$ is power consumption due to flying vertical distance (e.g., difference in height when the altitude changes) with $V_v$ vertical speed.

The turn energy may be computed as:

$$E_{turn} = P_{turn} * \frac{\Delta\theta}{\omega_{turn})} \tag{23}$$

Where $P_v$ is power consumption due to flying vertical distance (e.g., difference in height when the altitude changes) with $V_v$ vertical speed.

In the present embodiment, the applied energy model (e.g., Eq. (20)) is used to calculate the energy for path. In some embodiments, a flight path is determined such that the energy consumed by a drone is reduced (e.g., minimized).

The cost function or the objective function, CF, based on which the flight path is determined, adjusted or optimized, may be written as follows:

$$CF = T_E + J_1 + J_2 + J_3 + J_4 \tag{24}$$

Where $T_E$ is energy consumed in the path, and $J_1$, $J_2$, $J_3$, and $J_4$ are violation costs of obstacle constraint, collision constraint, altitude constraint, and speed constraint. The aim in determining a flight path is to adjust or optimize the flight path to minimize these quantities.

For the problem formulation, the objective is to maximize the number of UAVs 102 that can operate within a specific airspace while adhering to all regulatory, obstacle avoidance, UAV 102 performance constraints and the constraints described above. The problem variables include the number of UAVs 102 and their respective flight paths, with the primary aim to optimize the capacity of UAV 102 within a defined region while avoiding collisions (e.g., with one another, or with obstacles) and adhering to speed and altitude restrictions and minimizing energy consumption.

Key assumptions for this formulation include uniformity in UAV types and flight characteristics and the exclusion of weather-related impacts. The model considers a region of interest comprising certain forbidden regions or NFZs and multiple obstacles, collectively referred to as N-Obs. The UAVs 102 are tasked with navigating from starting positions (SPs) to target positions (TPs), constrained by the stipulated altitude and speed limits.

Thus, the global objective function is formulated as maximizing the capacity of UAVs 102 subject to maintaining safe distances from obstacles and other UAVs 102, adhering to maximum speed and altitude constraints. This optimization problem is tackled using the IPSO technique, aiming to determine the optimal number of UAVs 102 and their routes that satisfy all specified constraints while maximizing operational capacity within the airspace.

Figure 3:
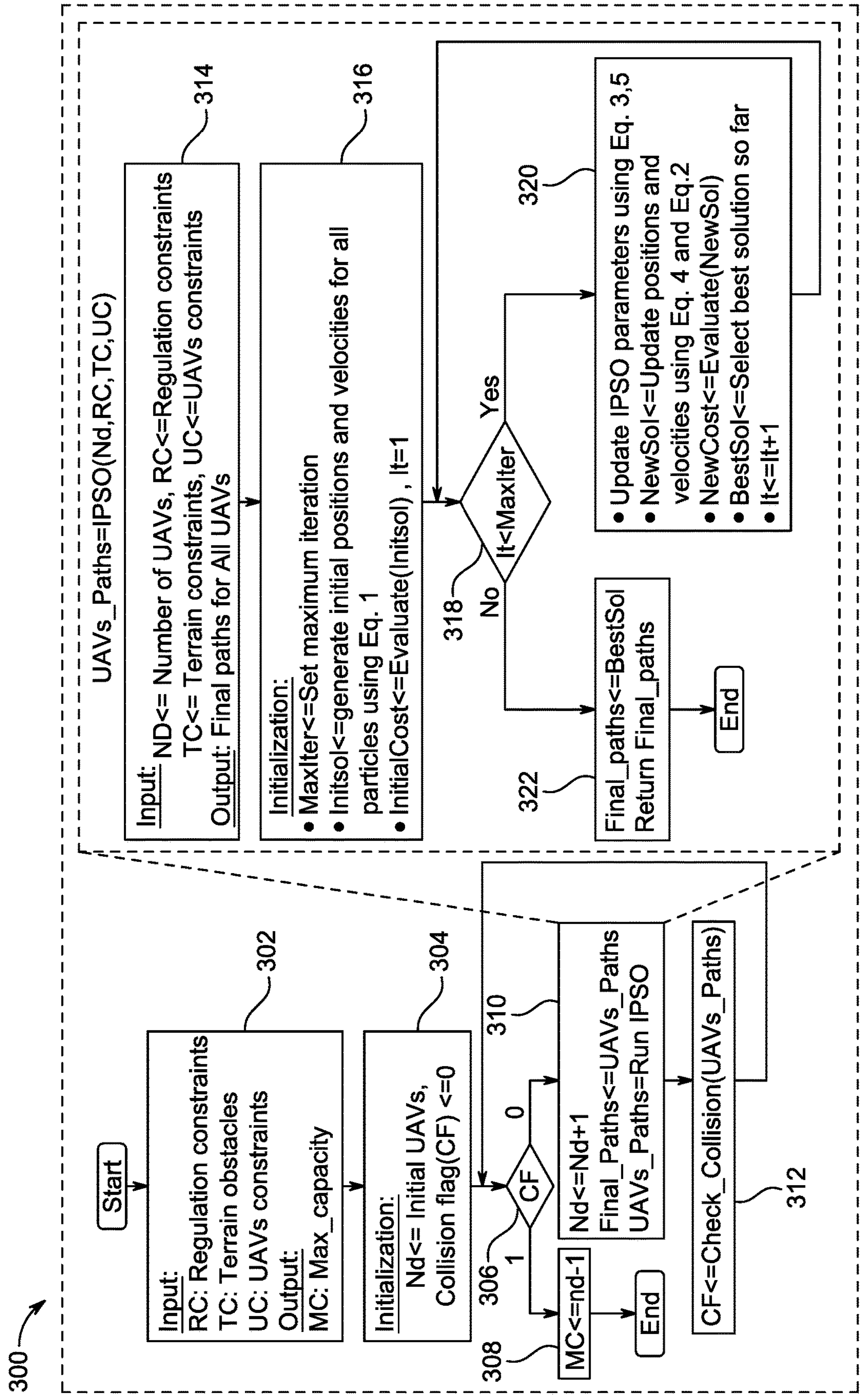
FIG. 3 illustrates a flow chart of a method configured for optimizing flight paths of the UAVs within specified constraints, according to certain embodiments.

FIG. 3 illustrates a flow chart of a method 300 configured for optimizing (e.g., maximizing) number of UAVs 102 configured to operate in a designated area, and for optimizing the flight paths of UAVs 102 within specified constraints. The approach detailed in FIG. 3, provides a method for determining (a) the maximum capacity of UAVs 102 that can operate safely within a specified area, and (b) their flight paths while adhering to regulatory and terrain constraints. The method utilizes an iterative process that begins with a predetermined number of UAVs 102 and gradually increases this number until a collision is detected. The maximum capacity of UAVs 102 is assessed by considering the number of UAVs 102 present just before a collision occurs. In some embodiments, the collision detection is managed by method 300 using a check-collision function that (a) verifies if the safety distance between any two UAVs 102 is maintained, and (b) checks for potential collisions with terrain obstacles. The check-collision function activates a collision flag (CF) to indicate a collision occurrence. Upon detecting a collision, the method ceases operation and returns the maximum UAV capacity.

In some embodiments, to optimize UAV flight paths, the method employs the IPSO (e.g., method 350) technique, an enhancement of the traditional PSO. The IPSO introduces particle update rules to boost PSO performance, ensuring that UAVs 102 navigate their routes while maintaining safe distances from each other and complying with regulatory and terrain constraints. The process iteratively adjusts to meet safety thresholds and operational efficiency, demonstrating an application of particle swarm principles to real-world challenges in UAV navigation and management. The method, thus, ensures that each UAV 102 operates optimally within a controlled airspace, maximizing utility while minimizing risk. In some embodiments, the method 300 is similar to the method 101 of FIG. 1B. The following paragraphs describe the method 300 in detail.

At step 302, input parameters, such as regulation constraints (RC) (e.g., altitude constraint, speed constraint, etc.), terrain constraints (TC) (e.g., obstacle constraint, etc.), UAV constraints (UC) (e.g., collision constraint, etc.) in the designated area where the UAVs are configured to operate are defined. This sets the framework for the UAV operation, ensuring all variables are tailored to specific operational limits and environmental factors.

At step 304, an initial number of UAVs 102 are set and a collision flag (CF) is set to a particular value (e.g., to 0 indicating no collision) to monitor interactions among the UAVs 102.

At step 306, the CF is evaluated. The CF may take one of two values indicating a collision or no collision (e.g., "0" indicating collision or "1" indicating a collision).

If a collision is indicated it may imply that the maximum capacity of the UAVs is exceeded. Accordingly, at step 308, the maximum capacity of UAVs is set to the number of UAVs determined in a previous iteration, or obtained by decreasing a specified quantity (e.g., "1") from the number of UAVs 102 in the current iteration (e.g., Nd).

If a collision is not detected, at step 310, the number of UAVs 102 is incremented by a specified quantity (e.g., "1" to obtain Nd+1) and the flight paths are obtained for the updated number of UAVs 102 (e.g., by executing method 350, which returns the best flight paths for each of the UAVs as described below). In generating the flight paths, the method 350 may ensure that UAVs 102 navigate their routes without violating any of the defined set of constraints. For example, the method 350 may implement a cost function having a set of cost terms that correspond to the set of constraints (e.g., cost function defined using Eq. 24) and adjust the flight path such that the cost function is reduced (e.g., minimized) to avoid any violation of the set of constraints or to minimize the energy consumed by the UAVs in traveling from the source location to the destination location.

After the paths are generated, at step 312, the check-collision function is executed to compute the CF, which is indicative of any collision between the UAVs for the generated paths. The method proceeds to step 306, where the CF is evaluated for any collision between the UAVs. If the CF indicates no collision between the UAVs or between the UAVs and obstacles, the process continues to step 310 to further increase the number of UAVs and generate the paths for the updated number of UAVs. On the other hand, if the CF indicates a collision between the UAVs or between the UAVs and obstacles, the process stops by setting the maximum capacity of the UAVs to the number of UAVs determined in a previous iteration (e.g., Nd−1) and outputting their associated flight paths. This ensures that each UAV 102 operates within safe parameters without violating any preset constraints and by maximizing the capacity of the UAVs 102 that can be operated in the designated area.

Referring to method 350, the method 350 generates or outputs the flight paths for a specified number of UAVs (e.g., determined in step 310). At step 314, the number of UAVs and the set of constraints are obtained as input (e.g., from step 310 or other steps of method 300).

As mentioned above, in some embodiments, IPSO, which is an enhanced version of PSO, may be implemented to determine the flight paths of the UAVs 102. The IPSO is an iterative method that determines or, adjusts or optimizes a flight path of the UAV in an iterative manner.

At step 316, the IPSO is initialized. The initialization operation sets a number of variables such as a maximum number of iterations, and generates an initial particle population in a search space that represents the number of UAVs in the designated area. The initialization operation also determines an initial position and velocity of each particle of the swarm using a specific equation (e.g., using chaos-based initialization as prescribed by Eq. (1)). An initial flight path is generated for each of the number of UAVs based on the initial position and velocity of each particle. A flight path may be represented as a sequence of way points from a source location to a destination location, where each way point is represented using three-dimensional (3D) location coordinates (e.g., Pi(x,y,z)). The cost of the initial paths is evaluated based on position of each particle through a cost function (e.g., Eq. (24)) that assesses the energy value and other constraints of each solution. As described above, the cost function integrates energy costs with potential penalties from obstacle collisions, proximity violations among UAVs 102, and breaches of altitude or speed limits. The current number of iterations is set to "1" indicating that this step is a first iteration of method 350.

Following the initialization, the method 350 enters a loop (e.g., steps 318-322) that continues until the maximum number of iterations is reached. In each iteration, either the flight paths from the previous iteration are further optimized (e.g., step 320), or the best flight paths determined so far for all the UAVs are output (e.g., step 322). For example, at step 318, the current number of iterations is evaluated. If the current number of iterations is less than the maximum number of iterations, the method proceeds to step 320 to further optimize a flight path from the previous iteration (e.g., the initial path) to generate an adjusted flight path and determine a value of the cost function for the optimized path. The step 320 also stores a path from one of these iterations as a best flight path (e.g., a flight path which has the least value for the cost function). The best path is determined for each of the number of UAVs (e.g., ND obtained in step 314). On the other hand, if the number of iterations is not less than the maximum number of iterations, the method proceeds to step 322 where the final flight paths (e.g., best flight paths) for all the UAVs are returned (e.g., to step 310 of method 300). Each iteration of the method 350 refines the UAV 102 paths to optimize the operational efficiency and safety of the UAV 102 fleet.

During each iteration (e.g., step 320), particle positions and velocities are updated (e.g., using Eqs. (2)-(5)), a new flight path is determined based on the position of the particles, the cost of the new population (e.g., new flight path) is evaluated based on energy consumption and other constraints (e.g., using Eq. (24)), and the best flight path found so far is tracked (e.g., a flight path which has the least value for the cost function). For example, in a first iteration, consider the value of the cost function of the initial paths (e.g., "Path 1") for a first UAV, a second UAV, and a third UAV are [1.1, 1.3, 1.02], and the initial paths for the three UAVs are stored as the best paths for the respective UAVs. In subsequent iterations, the new path for each UAV is evaluated with respect to the best paths found so far. For example, in a second iteration, if the cost function of the new paths (e.g., "Path 2") for the three UAVs evaluates to [1.02, 100.4, 1.015], while Path 2 for the first drone and the third drone are better than the best paths (e.g., $1.02<1.1$ and $1.015<1.02$), Path 2 for the second UAV is not collision-free compared with the best path (e.g., $100.4>1.3$), and this path causes collision either with obstacles or with other drones, and therefore it may be neglected for the second UAV. Thus, the best path is updated to [1.02, 1.3, 1.015] for the three UAVs. Continuing with the example, in a third iteration, if the cost function of Path 3 for the three UAVs evaluates to [1.52, 1.2, 1.005], then the best path is updated to [1.02, 1.2, 1.005] while ignoring the Path 3 for the first UAV since the value of the cost function associated with Path 3 for the first drone is not lesser than that of the best path (e.g., $1.52>1.02$). The same process is followed for subsequent iterations and their respective paths.

Several parameters such as inertia weight, a speed parameter, and acceleration coefficients, are determined in each iteration. The speed parameter is indicative of a speed at which the group of particles move in the search space. In some embodiments, a velocity of a first particle corresponding to a first UAV of the number of UAVs in the search space is determined based on (a) a velocity of the first particle, a first position of the first particle and a first position of the group of particles in a previous iteration, (b) the inertia weight parameter, and (c) the acceleration coefficients (e.g., using Eq. (2)). The inertia weight controls how much of the previous particle velocity influences its new velocity, while the acceleration coefficients impact how the particle's personal and the swarm's solutions affect trajectory of the particle. The IPSO parameters are adapted using Equations (3) and (5), dependent on the current iteration count and the maximum number of iterations, to allow for adaptive mutation of solutions. Particle velocities and positions are updated according to Equations (2) and (4), respectively, considering their current positions, velocities, personal bests, and global best solutions. In one aspect, the values of the inertia weight parameter and speed parameter are adjusted dynamically with each iteration.

Continuing with step 320, new positions and velocities are calculated based on the distances to personal and global best solutions. The method 350 also monitors and replaces inactive particles to prevent stagnation in local optima. For example, during the iterations, certain particles may become stuck in local optima and are unable to contribute to improving the flight path. The method 350 monitors these particles and keeps track of the number of iterations in which particles do not contribute to path improvement. If any particle exceeds the selected limit (e.g., 20% of the maximum iteration), it may be re-initialized with a fresh particle (e.g., using Eq. (1)). The new population (e.g., new flight path) cost may be assessed by applying the cost function (e.g., Eq. (24)) to new position of each particle, and the best flight path is determined by selecting the path with the lowest energy consumption, known as the global best solution. The iteration counter increments, and the loop (e.g., steps 318-322) concludes when the maximum iteration count is reached, at which point the best paths for all UAVs 102 are returned.

The IPSO algorithm effectively balances the exploration of new paths with the exploitation of known safe routes, ensuring a dynamic response to evolving conditions in the operating environment of the UAV 102. The final output, at step 322, provides optimized flight paths (e.g., best flight paths) that maximize the number of UAVs 102 within the set of constraints, highlighting capability of the system to adapt to complex operational scenarios.

The following are examples of algorithms for maximizing the UAVs capacity in a designated area under a set of constraints (e.g., algorithm 1) and optimizing a flight path for each of the UAVs under the set of constraints (e.g., algorithm 2). In some embodiments, the algorithms are similar to the flowchart of FIG. 3.

Algorithm 1—Maximum UAVs Capacity Under Regulation Constraints

Input:
- RC←Regulation Constraints
- TC←Terrain Constraints
- UC←UAVs Members' Constraints Output:
- MC←Maximum UAVs Capacity Initialization:

$N_d$←Initial number of UAVs
Collision-Flag (CF)←0
Formulation←Formulate the problem as a maximization optimization problem
while CF==0 do
$N_d$←$N_d$+1
  UAVs-Paths←IPSO ($N_d$, RC, TC, UC, SD)
  % [algorithm 2]
  CF←Check-collision (UAVs-Paths)
  end while
  MC←$N_d$−1
  Return Maximum allowable UAVs capacity (MC)

Algorithm 2: Improved PSO Algorithm for UAVs Path Planning

Input:
$N_d$←number of UAVs
RC←regulation constraints
TC←terrain constraints
UC←UAV self constraints
Output: Optimal paths of all UAVs
INITIALIZATION:
MaxIter←maximum iteration
InitSol←initialize positions and velocities with logistic map by Eq1
Initial_EnergyCost+Evaluate (InitSol)
Iter=1
while Iter<MaxIter do
Update IPSO parameters by Eq 3 and Eq 5
Update the velocities of particles for all populations using Eq2
Update the positions of particles for all populations using Eq4
New_EnergyCost←Evaluate the energy cost of generated particles
BestSol←Select Best Solution so far Replace inactive particles
Increment Iter
end while
Return Optimal paths for all UAVs The simulation experiments of the method of FIG. 3 are conducted under various conditions of fixed and variable altitudes. The simulations are performed using MATLAB software on a computer equipped with an Intel Core i7 CPU at 1.90 GHz, 8 CPUs, and 16 GB of RAM.

Three distinct scenarios were assessed in the simulation.

In a first scenario, the operational region was defined as a 1000 m by 1000 m area. This scenario included six obstacles and three NFZs, randomly positioned throughout the region. UAVs 102 were operated at fixed altitudes of 60 m, 100 m, and 120 m. A safety distance of 10 m was maintained between the UAVs 102, and the dimensions of obstacles and NFZs vary between 50 m to 104.12 m.

In a second scenario, the region size was increased to 2000 m by 2000 m. It contained eighteen obstacles and five NFZs, distributed randomly. The fixed altitudes for UAV operation, safety distances, and obstacle/NFZ sizes were consistent with those in Scenario 1.

In a third scenario, a smaller region size of 500 m by 500 m was considered, containing five obstacles and three NFZs. Obstacles and NFZs in this scenario range in size from 15 m to 70 m. UAVs 102 fly at altitudes of 50 m, 60 m, 80 m, and 100 m. This scenario is simulated 30 times to ensure reliability, with the results being the average of these runs.

TABLE 1

Parameters setting.

| Parameter | | | Value | | |
|---|---|---|---|---|---|
| Optimization approach | Value IPSO | Parameter | Scenario 1 | Scenario 2 | Scenario 3 |
| Population size | 200 | boundary | 1 Km × 1 Km | 2 Km × 2 Km | 500 m × 500 m |
| Max Iteration | 300 | Obstacles | 6 | 18 | 5 |
| Altitude | 60, 100, 120 m | NFZs | 3 | 5 | 3 |
| Obstacle and NFZs size | Ranging from 50 m to 104.12 m | | | | Ranging from 5 m to 10 m |

For all scenarios, the population size of the simulation was set to 200, and the maximum number of iterations is fixed at 300. These parameter settings are summarized in Table 1. The metric for evaluating performance, termed as 'region capacity', is defined by the maximum number of UAVs that successfully reach their destinations without incident.

Figure 4A:
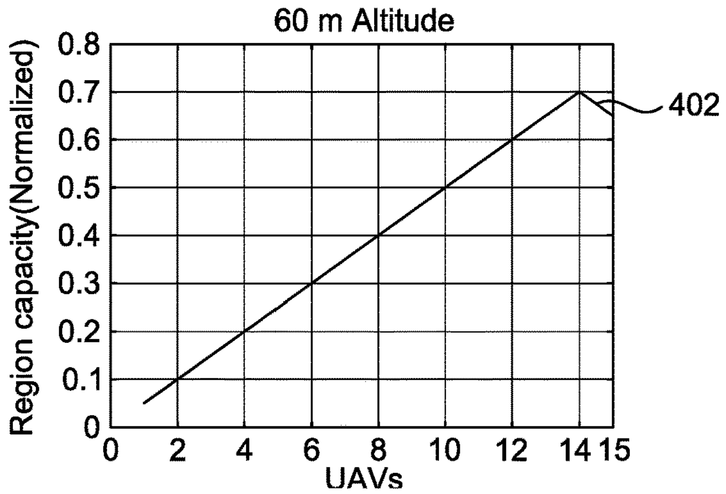
FIG. 4A illustrates a normalized region capacity with respect to the number of UAVs operating at an altitude of 60 meters, according to certain embodiments.
Figure 4B:
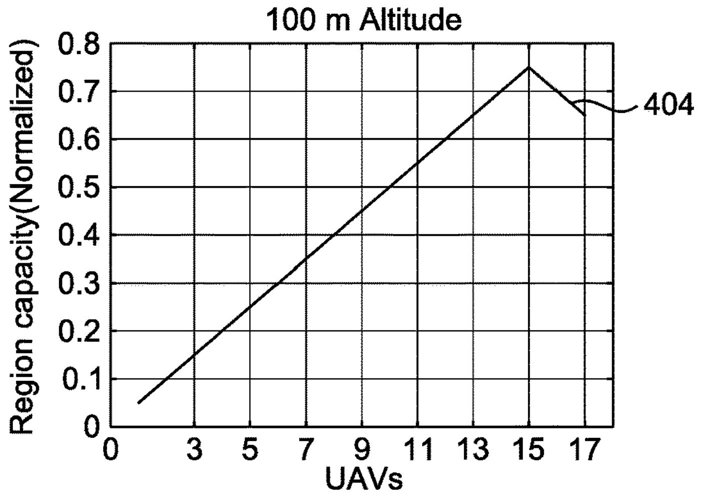
FIG. 4B illustrates a normalized region capacity with respect to the number of UAVs operating at an altitude of 100 meters, according to certain embodiments.
Figure 4C:
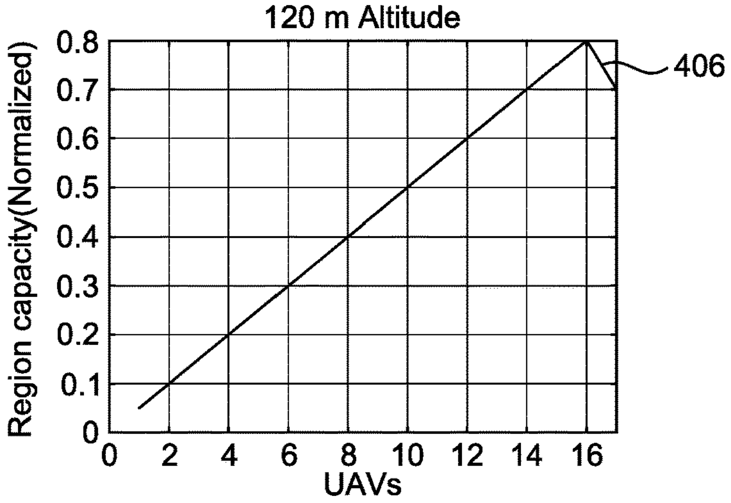
FIG. 4C illustrates a normalized region capacity with respect to the number of UAVs operating at an altitude of 120 meters, according to certain embodiments.

Each of FIG. 4A-FIG. 4C illustrates a progressive increase in the number of UAVs 102 until the maximum region capacity is reached, indicating a point at which any additional UAVs 102 would compromise safety due to potential collisions.

The capacity at 60 meters, as depicted by curve 402 of FIG. 4A, shows a gradual increase and a subsequent plateau, indicating a stable capacity before reaching a critical limit. At 100 meters, as depicted by curve 404 of FIG. 4B, the capacity initially rises but then slightly declines, reflecting a critical density that could lead to increased collision risks. In contrast, the capacity at 120 meters, as depicted by curve 406 of FIG. 4C, exhibits a steady ascent, followed by a sharp peak, denoting the optimal operation limit under given constraints.

Figure 5A:
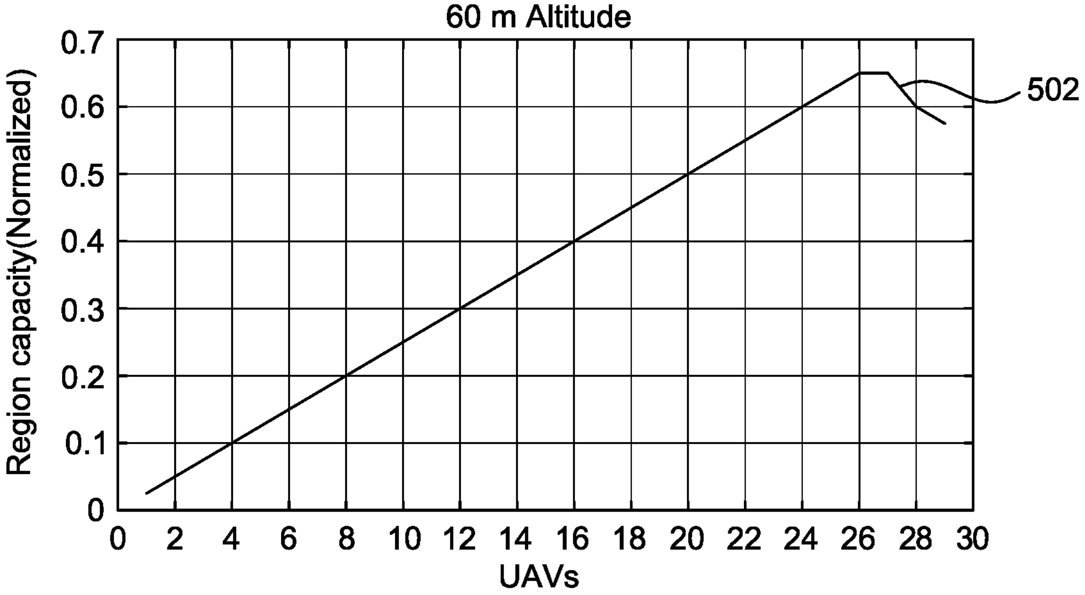
FIG. 5A illustrates a graphical representation of analysis under a second scenario with a larger region size, for an altitude of 60 meters, according to certain embodiments.
Figure 5B:
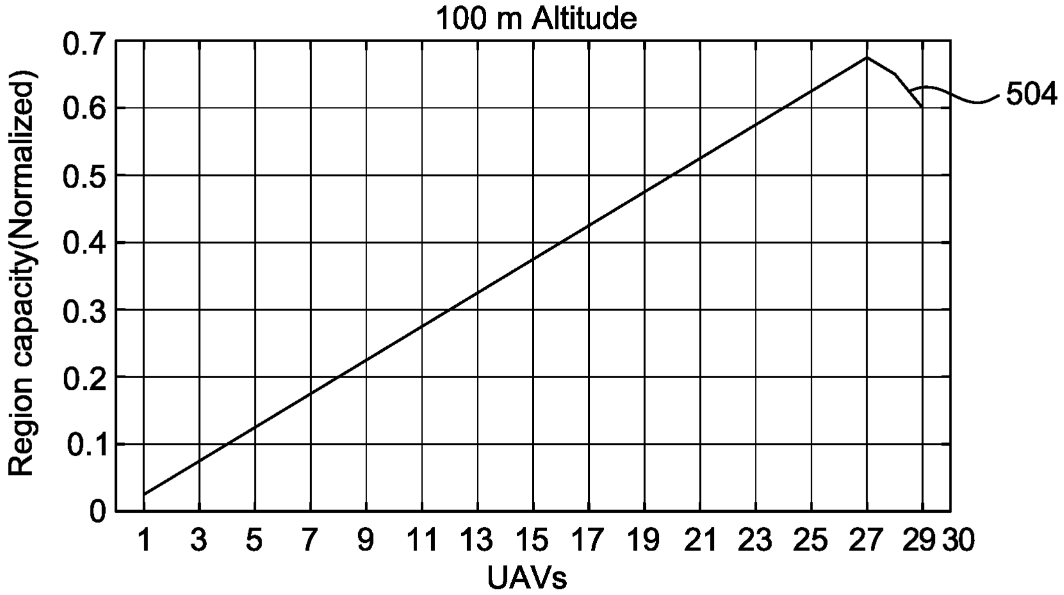
FIG. 5B illustrates a graphical representation of analysis under a second scenario with a larger region size, for an altitude of 100 meters, according to certain embodiments.
Figure 5C:
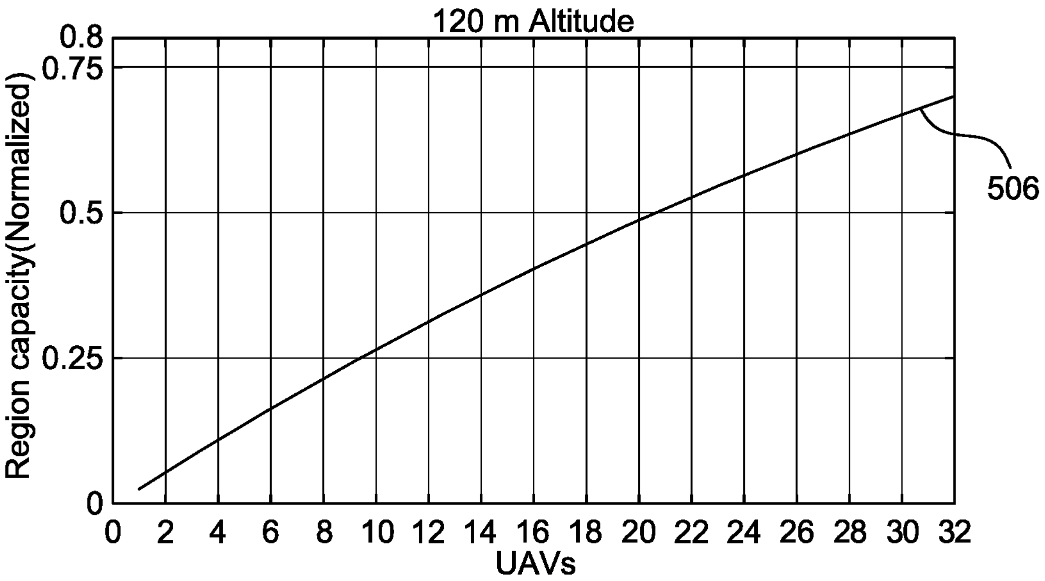
FIG. 5C illustrates a graphical representation of analysis under a second scenario with a larger region size, for an altitude of 120 meters, according to certain embodiments.

FIG. 5A-FIG. 5C indicate the impact of increased obstacles and NFZs on UAV capacity. Each of FIG. 5A-FIG. 5C illustrates a progressive increase in the number of UAVs 102 until the maximum region capacity is reached, indicating a point at which any additional UAVs 102 would compromise safety due to potential collisions. The capacity at 60 meters, as depicted by curve 502 of FIG. 5A, shows a gradual increase and a subsequent plateau, indicating a stable capacity before reaching a critical limit. At 100 meters, as depicted by curve 504 of FIG. 5B, the capacity initially rises but then slightly declines, reflecting a critical density that could lead to increased collision risks. In contrast, the capacity at 120 meters, as depicted by curve 506 of FIG. 5C, exhibits a steady ascent, followed by a sharp peak, denoting the optimal operation limit under given constraints.

Figure 6A:
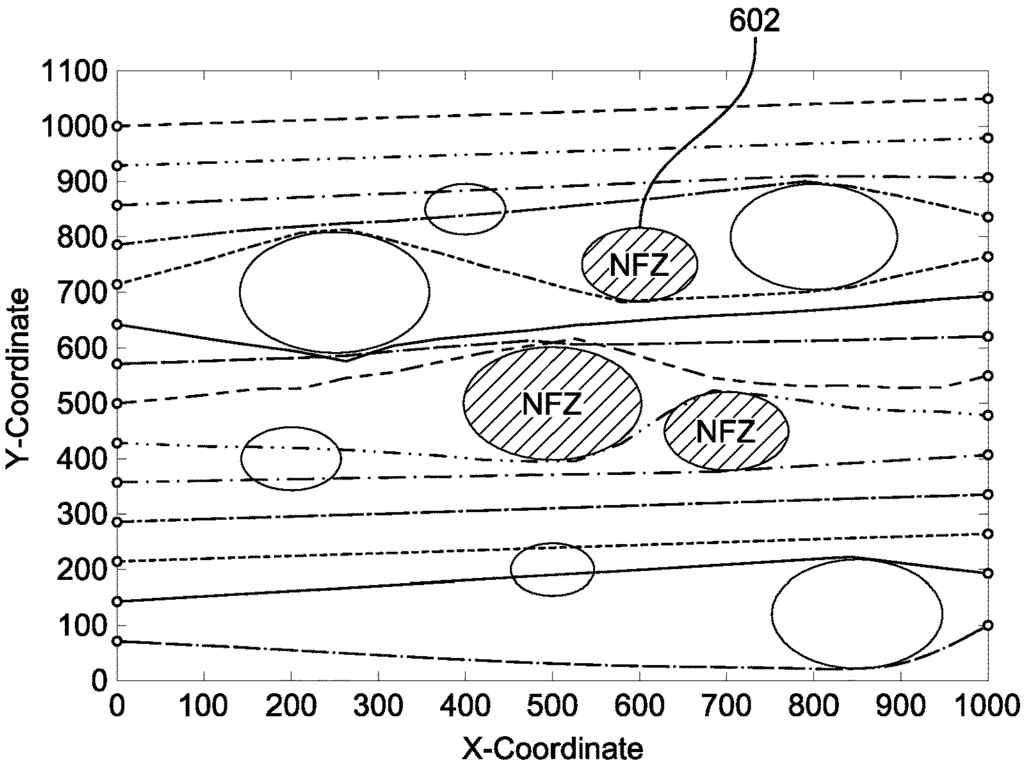
FIG. 6A illustrates two-dimensional (2D) views of UAV paths as derived from the Improved Particle Swarm Optimization (IPSO), according to certain embodiments.

FIG. 6A presents two-dimensional views of UAV paths as derived from the IPSO.

Figure 6B:
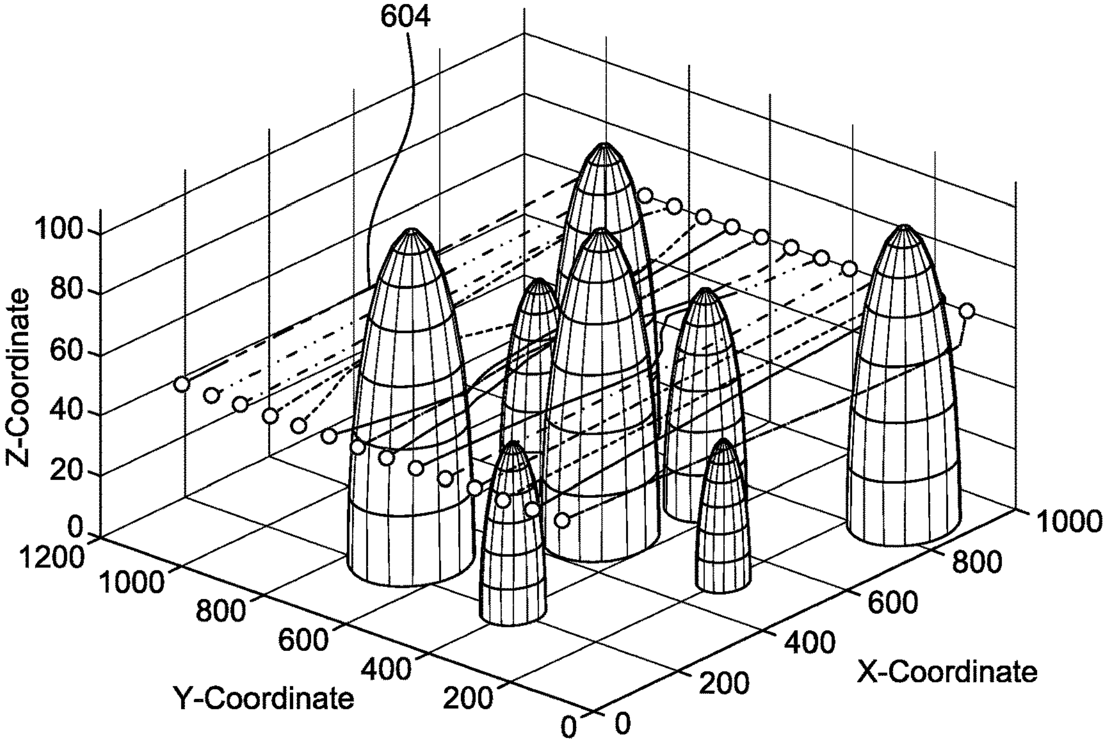
FIG. 6B illustrates three-dimensional (3D) views of UAV paths as derived from the IPSO, according to certain embodiments.

FIG. 6B presents three-dimensional views of UAV paths as derived from the IPSO. These visualizations display feasible flight paths that avoid conflicts with terrain obstacles, effectively illustrating the trajectories of UAVs 102 within the operational space. The two-dimensional view, curve 602 of FIG. 6A, maps out the X and Y coordinates overlaid with obstacle and NFZ distributions, while the three-dimensional view, curve 604 of FIG. 6B, adds depth by including the Z-coordinate, giving a comprehensive perspective on how UAVs 102 navigate around obstacles.

Figure 7:
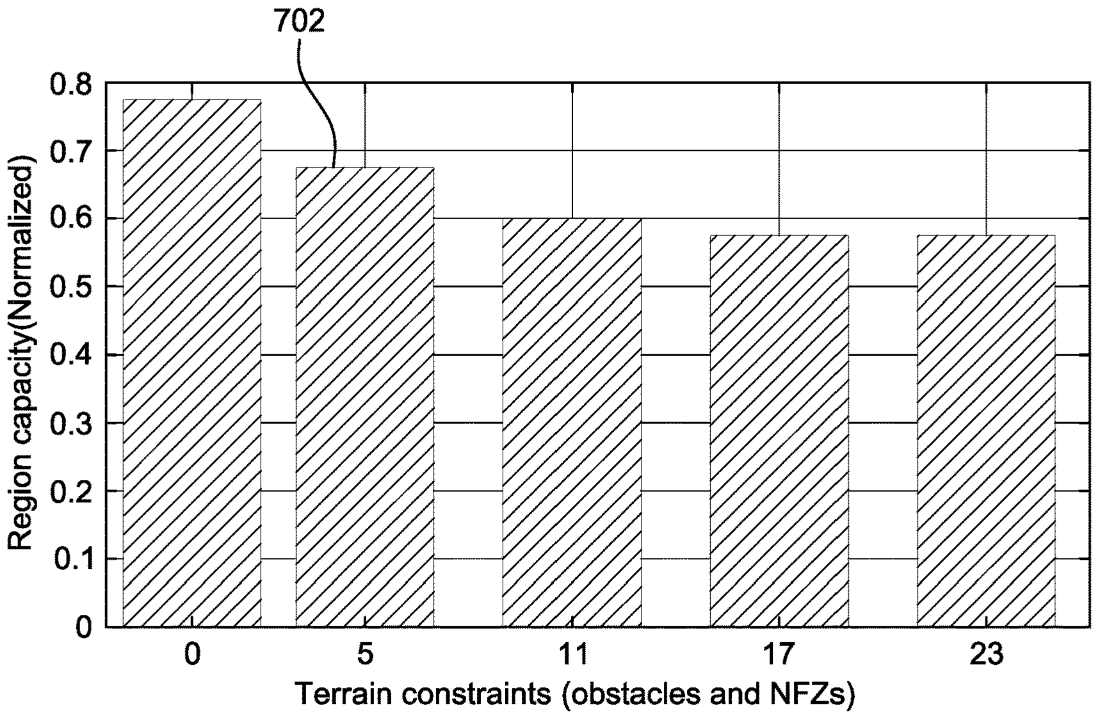
FIG. 7 illustrates normalized region capacity for different numbers of terrain constraints, including obstacles and no-fly zones (NFZs), according to certain embodiments.

FIG. 7 illustrates the normalized region capacity for different numbers of terrain constraints, including obstacles and NFZs, as presented in the vertical bars 702. The region capacity is normalized on a scale from 0 to 0.8, as shown on the vertical axis, against the number of terrain constraints presented on the horizontal axis, ranging from 0 to 23. Each bar indicates how the capacity to accommodate UAVs 102 decreases as the number of constraints increases. Specifically, the capacity is highest with no constraints and progressively decreases as more obstacles and NFZs are introduced into the region. Such depiction serves to quantify the direct impact of physical and regulatory constraints on operational capacity in UAV 102 deployments.

Figure 8:
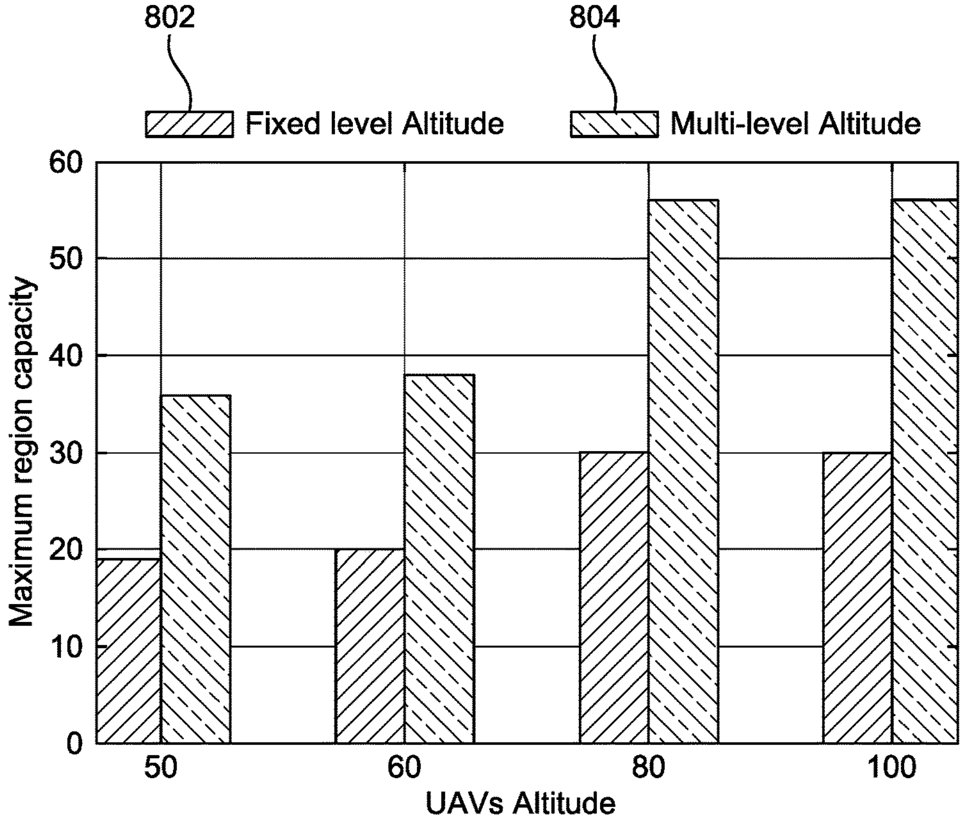
FIG. 8 illustrates region capacity concerning different flying altitudes for UAVs, under scenarios of fixed and multi-level altitudes, according to certain embodiments.

FIG. 8 depicts the region capacity concerning different flying altitudes for UAVs 102, under scenarios of fixed and multi-level altitudes, represented by 802 and 804 bars, respectively. The bar chart compares the maximum number of UAVs 102 that can successfully reach their destinations at altitudes of 50 m, 60 m, 80 m, and 100 m. The effect of altitude on region capacity is evident, as higher altitudes generally allow for greater capacity, attributed to the reduced risk of collision with ground-based obstacles. However, the chart shows that increasing the altitude beyond 80 m does not significantly increase capacity, which is consistent with the maximum height of obstacles set at 70 m in the simulation scenarios. The chart effectively captures the dual effect of altitude on UAV operation, enhancing capacity by reducing terrain collisions at lower altitudes and facing increased risks of aerial collisions at higher altitudes. The visual data representations underscore the nuanced impacts of altitude and obstacle density on UAV operational strategies.

In the present disclosure, a safety system and method are implemented for maximizing the operational capacity of UAVs 102 within the confines of a set of constraints. The system incorporates critical factors, such as NFZs, altitude restrictions, and terrain obstacles to optimize UAV trajectories. The system utilizes a robust algorithm to ascertain the upper limit of UAVs 102 that can safely operate within a designated area, compliant with both regulatory and terrain constraints.

The effectiveness of the proposed safety system was verified through simulations, which confirmed its capability to enhance the operational capacity of UAVs 102 while maintaining adherence to regulatory constraints. Simulation outcomes showed that the system could elevate the capacity of UAVs 102 to its optimal potential, ensuring safety and regulatory compliance, which holds profound implications for UAV operations in complex and regulated airspace. By implementing this system, UAV operations can be optimized, efficiency improved, and the number of UAVs 102 that can safely operate within a specific area maximized.

Future enhancements to the system may involve incorporating real-time data and dynamic airspace constraints into the optimization framework. This advancement may enable the system to adjust to evolving conditions, optimizing UAV trajectories dynamically, thus further enhancing operational efficiency and safety.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method of coordinating a number of unmanned aerial vehicles (UAVs) to be deployed in a region under a set of constraints, the method comprising:

obtaining constraint data that is indicative of the set of constraints under which the number of UAVs are configured to fly in the region, the constraint data indicating, when the number of UAVs fly in the region, requirements to be satisfied with respect to a safety distance between UAVs, a safety distance between an UAV and an obstacle, an UAV altitude limit, and an UAV speed limit;

defining a cost function having (1) an UAV energy consumption term that is indicative of an energy consumption of each UAV for flying from a source location to a destination location along a given flight path, and (2) a set of cost terms that correspond to the set of constraints;

executing an UAV-capacity maximization function to determine a maximum UAV number of a group of UAVs that is able to fly in the region without violating any constraint of the set of constraints by:

(1) setting an UAV number of the group of UAVs at an initial value, (2) iteratively performing:

(i) based on the defined cost function, applying a modified Particle Swarm Optimization algorithm to determine flight paths for the group of UAVs, and (ii) updating the UAV number by adding a predetermined incremental value to the UAV number of a previous iteration, until the requirement with respect to the safety distance between UAVs or the requirement with respect to the safety distance between an UAV and an obstacle is violated, and (3) determining the updated UAV number as the maximum UAV number;

transmitting the determined flight paths to a group of UAVs that has the determined maximum UAV number of UAVs; and monitoring flight paths of the group of UAVs and adjusting the flight paths of the group of UAVs based on the transmitted flight paths, to ensure that all UAVs in the group operate in the region without violating any constraint of the set of constraints, wherein:

by applying the modified Particle Swarm Optimization algorithm, the flight paths of the group of UAVs are determined to minimize the energy consumption, an initial position and velocity of each particle of the modified Particle Swarm Optimization algorithm are determined using chaos-based initialization, and for each iteration of the modified Particle Swarm Optimization algorithm, an inertia weight and an acceleration coefficient are adjusted based on a current iteration count and a predetermined maximum iteration number.

2. The method of claim 1, wherein the set of cost terms include a first cost term that is indicative of whether a distance between a pair of UAVs in the group of UAVs satisfies a collision constraint, and the first cost term is computed by:

determining a first distance between a first UAV of the pair of UAVs and a second UAV of the pair of UAVs based on location co-ordinates of the pair of UAVs obtained from the flight paths, and determining that the first cost term satisfies the collision constraint when the first distance is greater than a first threshold distance specified in the requirement with respect to the safety distance between UAVs.

3. The method of claim 1, wherein executing the UAV-capacity maximization function to generate the flight paths for the group of UAVs includes:

obtaining a first set of flight paths for a first UAV of the group of UAVs, computing the cost function for each flight path of the first set of flight paths, and selecting one of the first set of flight paths for which the cost function evaluates to a least value, as a first flight path of the flight paths of the first UAV.

4. The method of claim 3, wherein selecting one of the first set of flight paths includes:

until the cost function is minimized, iteratively performing:

defining the first flight path of the first UAV based on a position of a first particle of a group of particles that moves in a search space, wherein the group of particles representative of the group of UAVs are configured to move in the search space representative of the region UAVs are configured to fly, computing the cost function for the first flight path based on the position of the first particle, comparing the cost function of the first flight path with the cost function of a best flight path of the first UAV, and selecting the first flight path as the best flight path based on a determination that the cost function of the first flight path is lesser than the cost function of the best flight path.

5. The method of claim 4, wherein defining the first flight path based on the position of the first particle in each iteration includes:

determining values of the inertia weight parameter, the acceleration coefficient, and a speed parameter, wherein the speed parameter is indicative of a speed at which the group of particles move in the search space, determining a velocity of the first particle corresponding to the first UAV in the search space based on (a) a velocity of the first particle, a first position of the first particle and a first position of the group of particles in a previous iteration, (b) the inertia weight parameter, and (c) the acceleration coefficient, and determining a position of the first particle in the search space based on a position of the first particle in the previous iteration, the velocity of the first particle and the speed parameter.

6. The method of claim 4, wherein selecting one of the first set of flight paths includes:

prior to execution of the iterations, computing an initial position and initial velocity of the first particle of the group of particles in the search space using a one-dimensional logistic map, and assigning an initial flight path determined based on the initial position and initial velocity of the first particle as the best flight path for the first UAV.

7. The method of claim 1, wherein each of the flight paths includes multiple way points from a source location to a destination location, and wherein each way point is represented using three-dimensional (3D) location coordinates.

8. The method of claim 1, wherein defining the cost function includes:

obtaining obstacle data of an obstacle, wherein the obstacle data includes 3D location coordinates of the obstacle and a radius of a half-sphere representative of the obstacle.

9. The method of claim 8, wherein the 3D location coordinates of the obstacle are determined based on 3D coordinates of a center of the half-sphere representative of the obstacle.

10. The method of claim 8, wherein the set of cost terms include a second cost term that is indicative of whether a second distance between the obstacle and an UAV of the group of UAVs satisfies an obstacle constraint, wherein the second distance is determined based on location coordinates of (a) the obstacle and (b) a particle of a group of particles corresponding to the UAV, where in the group of particles is representative of the group of UAVs, and wherein the group of particles move in a search space representative of the region, and the second cost term is determined as satisfying the obstacle constraint when the second distance is greater than a second specified threshold specified in the requirement with respect to the safety distance between an UAV and an obstacle.

11. The method of claim 1, wherein applying the modified Particle Swarm Optimization algorithm to determine flight paths for the group of UAVs includes:

obtaining UAV data of an UAV of the group of UAVs, wherein the UAV data includes 3D location coordinates, speed, and altitude of the UAV.

12. The method of claim 11, wherein the set of cost terms include a third cost term that is indicative of whether the altitude of the UAV satisfies an altitude constraint, and the third cost term is determined as satisfying the altitude constraint when the altitude of the UAV is lesser than a third specified threshold specified in requirement with respect to the altitude limit.

13. The method of claim 11, wherein the set of cost terms include a fourth cost term that is indicative of whether the speed of the UAV satisfies a speed constraint, and the fourth cost term is determined as satisfying the speed constraint when the speed of the UAV is lesser than a fourth specified threshold specified in the requirement with respect to the speed limit.

14. The method of claim 1, wherein applying the modified Particle Swarm Optimization algorithm to determine flight paths for the group of UAVs includes:

computing the UAV energy consumption term for an UAV of the group of UAVs based on a calculated (a) distance and speed to be traveled in each of a horizontal and vertical direction, and (b) angular speed and angle of turn taken by the UAV for the given flight path of the flight paths.

15. A non-transitory computer-readable storage medium for storing computer-readable instructions that, when executed by a computer, cause the computer to perform a method, the method comprising:

obtaining constraint data that is indicative of a set of constraints under which a number of unmanned aerial vehicles (UAVs) are configured to fly in a region, the constraint data indicating, when the number of UAVs fly in the region, requirements to be satisfied with respect to a safety distance between UAVs, a safety distance between an UAV and an obstacle, an UAV altitude limit, and an UAV speed limit;

defining a cost function having (1) an UAV energy consumption term that is indicative of an energy consumption of each UAV to fly from a source location to a destination location along a given flight path, and (2) a set of cost terms that correspond to the set of constraints; and executing an UAV-capacity maximization function to determine a maximum UAV number of a group of UAVs that is able to fly in the region without violating any constraint of the set of constraints by:

(1) setting an UAV number of the group of UAVs at an initial value, (2) iteratively performing:

(i) based on the defined cost function, applying a modified Particle Swarm Optimization algorithm to determine flight paths for the group of UAVs, and (ii) updating the UAV number by adding a predetermined incremental value to the UAV number of a previous iteration, until the requirement with respect to the safety distance between UAVs or the requirement with respect to the safety distance between an UAV and an obstacle is violated, and (3) determining the updated UAV number as the maximum UAV number;

transmitting the determined flight paths to a group of UAVs that has the determined maximum UAV number of UAVs; and monitoring flight paths of the group of UAVs and adjusting the flight paths of the group of UAVs based on the transmitted flight paths, to ensure that all UAVs in the group operate in the region without violating any constraint of the set of constraints, wherein:

by applying the modified Particle Swarm Optimization algorithm, the flight paths of the group of UAVs are determined to minimize the energy consumption, an initial position and velocity of each particle of the modified Particle Swarm Optimization algorithm are determined using chaos-based initialization, and for each iteration of the modified Particle Swarm Optimization algorithm, an inertia weight and an acceleration coefficient are adjusted based on a current iteration count and a predetermined maximum iteration number.

* * * * *